US012707508B2

(12) United States Patent
Yamaoka

(10) Patent No.: US 12,707,508 B2
(45) Date of Patent: Aug. 11, 2026

(54) VEHICLE DEVICE FOR A TARGET VEHICLE AND COMMUNICATION MANAGEMENT METHOD

(71) Applicant: DENSO CORPORATION, Kariya-city (JP)

(72) Inventor: Kousuke Yamaoka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 342 days.

(21) Appl. No.: 18/362,278

(22) Filed: Jul. 31, 2023

(65) Prior Publication Data

US 2023/0379978 A1 Nov. 23, 2023

Related U.S. Application Data

(63) Continuation of application No. PCT/JP2022/001360, filed on Jan. 17, 2022.

(30) Foreign Application Priority Data

Feb. 5, 2021 (JP) ................................ 2021-017661

(51) Int. Cl.

| | |
|---|---|
| ***H04W 74/0833*** | (2024.01) |
| ***H04W 28/02*** | (2009.01) |
| ***H04W 36/14*** | (2009.01) |
| ***H04W 36/32*** | (2009.01) |

(52) U.S. Cl.

CPC ..... *H04W 74/085* (2013.01); *H04W 28/0273* (2013.01); *H04W 28/0289* (2013.01); *H04W 36/1446* (2023.05); *H04W 36/326* (2023.05)

(58) Field of Classification Search

CPC ......... H04W 64/00; H04W 4/40; H04W 4/44; H04W 4/46; H04W 4/48; H04W 36/326; H04W 36/1446; H04W 74/085; H04W 28/0273; H04W 28/0289; H04L 67/10; H04L 1/20

See application file for complete search history.

(56) References Cited

U.S. PATENT DOCUMENTS

2018/0234901 A1* 8/2018 Suh .................... H04W 36/322
2019/0253948 A1 8/2019 Nagura et al.

FOREIGN PATENT DOCUMENTS

JP 2006262176 A 9/2006
JP 2019033395 A 2/2019
JP 2019140563 A 8/2019

* cited by examiner

*Primary Examiner* — Peter Chen

(74) *Attorney, Agent, or Firm* — Harness, Dickey & Pierce, PLC

(57) ABSTRACT

A vehicle device includes: an estimation information acquirer configured to acquire estimation information that enables estimation of an offloading wait time according to an encounter probability at which a target vehicle encounters an access point of a wireless network usable as a second line; a wait time estimator configured to estimate the offloading wait time based on the estimation information acquired by the estimation information acquirer; and an offloading determiner configured to determine whether or not offloading is performable based on the offloading wait time estimated by the wait time estimator.

6 Claims, 22 Drawing Sheets

1
2
CS
3
TCS
IT
MPN
CBS
WLANCN
WRC
WBS
WRC
WBS
4
OV
4
HV

FIG. 3

| Element | Value | From |
|---|---|---|
| AP_ID | | SYSTEM |
| MESH CODE | | SYSTEM |
| SSID | | COMMUNICATION CARRIER |
| BSSID | | TRAVEL LOG |
| RADIO TYPE | | TRAVEL LOG |
| CHANNEL | | TRAVEL LOG |
| LATITUDE | | COMMUNICATION CARRIER |
| LONGITUDE | | COMMUNICATION CARRIER |
| ALTITUDE | | TRAVEL LOG |
| RSSI | | TRAVEL LOG |
| THROUGHPUT | | TRAVEL LOG |
| PASSING SPEED | | TRAVEL LOG |
| PASSING TIME | | TRAVEL LOG |
| AVAILABILITY FLAG | | SYSTEM |

FIG. 6

$$T_{wifi\_def\mathrm{A}} = \frac{L_{mesh}}{\sqrt{n} \times V_{base}}$$

Figure 8:
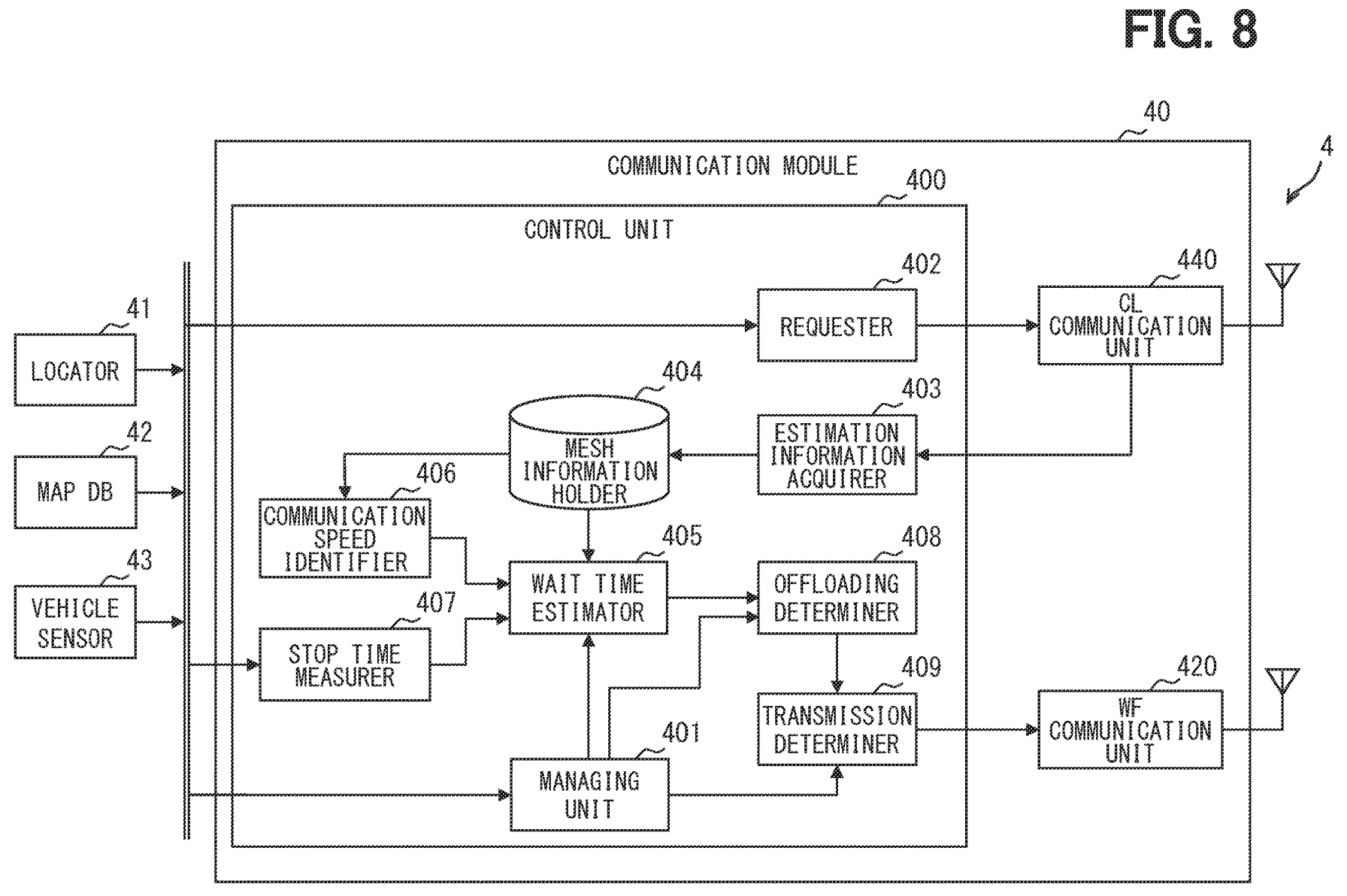

40 COMMUNICATION MODULE

400 CONTROL UNIT

440 CL COMMUNICATION UNIT

420 WF COMMUNICATION UNIT

402 REQUESTER

403 ESTIMATION INFORMATION ACQUIRER

408 OFFLOADING DETERMINER

409 TRANSMISSION DETERMINER

404 MESH INFORMATION HOLDER

405 WAIT TIME ESTIMATOR

401 MANAGING UNIT

406 COMMUNICATION SPEED IDENTIFIER

407 STOP TIME MEASURER

41 LOCATOR

42 MAP DB

43 VEHICLE SENSOR

FIG. 10

$$T_{send\_delay} = T_{wifi\_def} + \frac{D_{sent}}{S_{sent}} + T_{V0}$$

FIG. 11

$$T_{send\_delay} < \min(T_{sendallow\_delay}, T_{store\_lim})$$

FIG. 12

$$T_{delay\_count} > \min(T_{sendallow\_delay}, T_{store\_lim}) - \frac{D_{sent}}{S_{sent}}$$

| CONNECTED AP INFORMATION | | |
| --- | --- | --- |
| | AP#0 AP_ID | 00000 |
| | AP#0 REACH PROBABILITY | 90% |
| | AP#2 AP_ID | 00002 |
| | AP#2 REACH PROBABILITY | 20% |
| | AP#3 AP_ID | 00003 |
| | AP#3 REACH PROBABILITY | 70% |
| | AP#N AP_ID | . . . |
| | AP#N REACH PROBABILITY | . . . |

FIG. 20

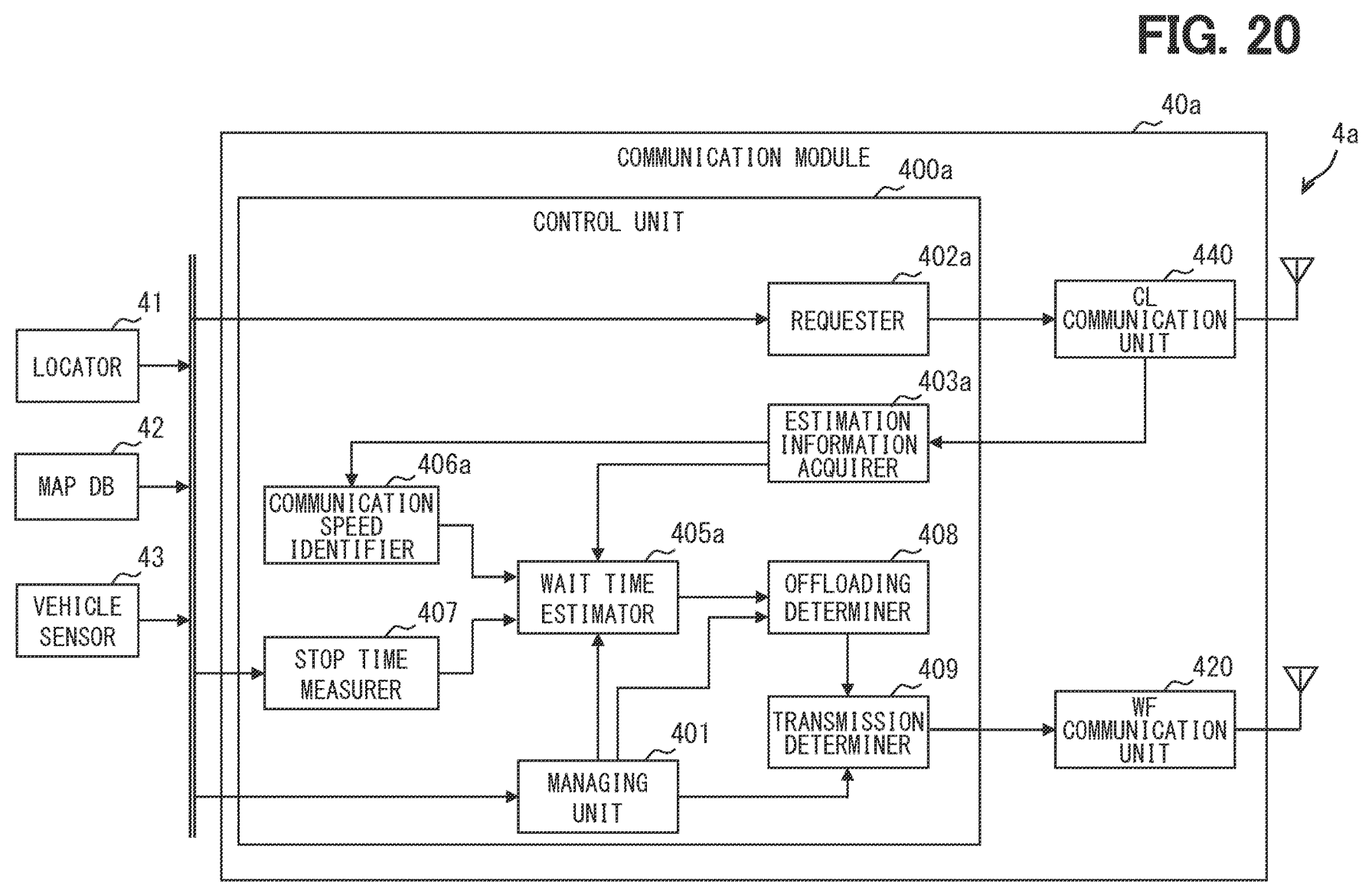

4a
40a
COMMUNICATION MODULE
400a
CONTROL UNIT
440
CL COMMUNICATION UNIT
420
WF COMMUNICATION UNIT
402a
REQUESTER
403a
ESTIMATION INFORMATION ACQUIRER
408
OFFLOADING DETERMINER
409
TRANSMISSION DETERMINER
405a
WAIT TIME ESTIMATOR
401
MANAGING UNIT
406a
COMMUNICATION SPEED IDENTIFIER
407
STOP TIME MEASURER
41
LOCATOR
42
MAP DB
43
VEHICLE SENSOR 4b
40b
COMMUNICATION MODULE
400b
CONTROL UNIT
41
LOCATOR
42
MAP DB
43
VEHICLE SENSOR
402a
REQUESTER
440
CL COMMUNICATION UNIT
410
SELECTOR
403b
ESTIMATION INFORMATION ACQUIRER
406
COMMUNICATION SPEED IDENTIFIER
411
REACHABLE DISTANCE IDENTIFIER
405b
WAIT TIME ESTIMATOR
408
OFFLOADING DETERMINER
407
STOP TIME MEASURER
409
TRANSMISSION DETERMINER
420
WF COMMUNICATION UNIT
401
MANAGING UNIT

FIG. 26

VEHICLE DEVICE FOR A TARGET VEHICLE AND COMMUNICATION MANAGEMENT METHOD

CROSS REFERENCE TO RELATED APPLICATION

The present application is a continuation application of International Patent Application No. PCT/JP2022/001360 filed on Jan. 17, 2022, which designated the U.S. and claims the benefit of priority from Japanese Patent Application No. 2021-017661, filed on Feb. 5, 2021. The entire disclosures of all of the above applications are incorporated herein by reference.

TECHNICAL FIELD

The present disclosure relates to a vehicle device, a server, and a communication management method.

BACKGROUND

A technology is known that enables wireless communication even in vehicles by using wide-area wireless communication that uses a mobile phone network. For example, a wireless communication device used in a vehicle connects to a network via wireless communication with a wireless LAN access point such as Wi-Fi (registered trademark), for transmitting and receiving information.

SUMMARY

A vehicle device of the present disclosure is usable for a target vehicle equipped with a communication device that is capable of using a first line and a second line with respectively different communication methods for data transmission via a wireless network, and is capable of offloading data transmission from the first line to the second line. The vehicle device includes: an estimation information acquirer configured to acquire estimation information that enables estimation of an offloading wait time according to an encounter probability at which the target vehicle encounters an access point of the wireless network used as the second line; a wait time estimator configured to estimate the offloading wait time based on the estimation information acquired by the estimation information acquirer; and an offloading determiner configured to determine whether or not offloading is performable based on the offloading wait time estimated by the wait time estimator.

For example, a communication management method of the present disclosure according to a first aspect is usable in a target vehicle and implemented by at least one processor. The target vehicle is equipped with a communication device that is (i) capable of using a first line and a second line with respectively different communication methods for data transmission via a wireless network, and (ii) capable of offloading data transmission from the first line to the second line. The communication management method includes: an estimation information acquisition step of acquiring estimation information that enables estimation of an offloading wait time according to an encounter probability at which the target vehicle encounters an access point of the wireless network used in the second line; a wait time estimation step of estimating the offloading wait time based on the estimation information acquired by the estimation information acquisition step; and an offloading determination step of determining whether or not offloading is performable based on the offloading wait time estimated by the wait time estimation step.

Further, a server of the present disclosure may include an estimation information determiner configured to determine estimation information, which is information that enables estimation of an offloading wait time by an amount of which a target vehicle waits for offloading of data transmission from a first line to a second line, and a transmission unit configured to transmit the estimation information determined by the estimation information determiner, to the target vehicle. The offloading wait time may be determined according to an encounter probability of the target vehicle encountering an access point of a wireless network that is usable as the second line. Furthermore, the target vehicle may be equipped with a communication device that is capable of using the first line and the second line with respectively different communication methods for the data transmission via the wireless network, and may be capable of offloading the data transmission from the first line to the second line.

A communication management method of the present disclosure according to a second aspect may be a method implemented by at least one processor. The communication management method includes an estimation information determination step of determining estimation information, and a transmission step of transmitting the estimation information determined by the estimation information determination step, to the target vehicle. The estimation information is information that enables estimation of an offloading wait time by an amount of which a target vehicle waits for offloading of data transmission from a first line to a second line. The offloading wait time is determinable according to an encounter probability of the target vehicle encountering an access point of a wireless network that is usable as the second line.

BRIEF DESCRIPTION OF THE DRAWINGS

The above and other objects, features and advantages of the present disclosure will become more apparent from the following detailed description made with reference to the accompanying drawings. In the drawings:

FIG. 3 is a diagram for explaining an example of AP map information;

FIG. 6 is a diagram showing an example of an equation for calculating the area-specific wait time;

FIG. 8 is a diagram showing an example of a schematic configuration of a vehicle unit, a communication module, and a control unit;

FIG. 10 is a diagram showing an example of an equation for calculating an offloading wait time;

FIG. 11 is a diagram showing an example of conditions for determining whether or not offloading is performable;

FIG. 12 is a diagram showing an example of an expiration condition for a count value of an expiration timer;

FIG. 20 is a diagram showing an example of schematic configurations of a vehicle unit, a communication module, and a control unit;

FIG. 26 is a flowchart showing an example of a flow of an offload related process in the control unit.

DETAILED DESCRIPTION FOR CARRYING OUT THE DISCLOSURE

Figure 1:
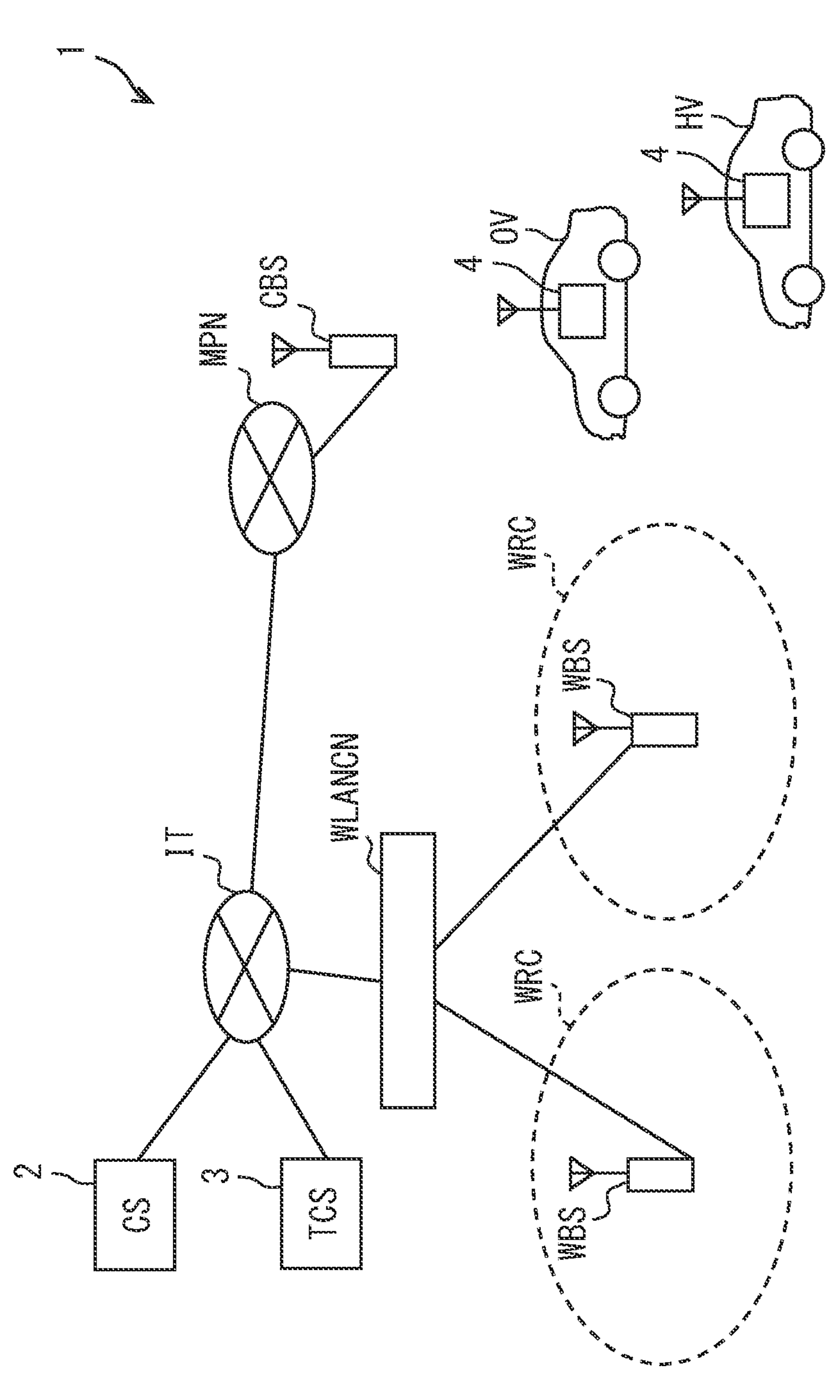
FIG. 1 is a diagram showing an example of a schematic configuration of a vehicle communication system.

Wide-area wireless communication using a mobile phone network (hereinafter referred to as cellular communication) is considered to have higher communication reliability than wireless LAN, but increases communication costs due to an increase in communication data. On the other hand, when connecting to a network via wireless communication with a wireless LAN access point, it is possible to reduces communication costs by offloading of data transmission using the wireless LAN instead of cellular communication. When data is transmitted using offloading, it is desirable to improve an offloading rate, which is the rate at which data to be transmitted can be transmitted by offloading. If the presence or absence of access points can be predicted, it is possible to improve the offloading rate.

As a method for improving the offloading rate, the following methods may be conceivable. For example, it may be conceivable to improve the offloading rate by controlling an auto-drive vehicle to travel by way of wireless LAN access points. However, in such case, there is a problem that the travel route of the vehicle is limited. In addition, it may be conceivable to improve the offloading rate by offloading the information with the access points, which are identifiable from route information set for the vehicle by the user using a navigation function. However, in such case, there is a problem that the offloading rate cannot be improved unless the travel route of the vehicle is set in advance.

It is an object of the present disclosure to provide a vehicle device, a server and a communication management method, which are capable of providing an improved offloading rate in data transmission of a vehicle, without limiting a vehicle's travel route or without presetting a vehicle's travel route.

In order to achieve the above object, a vehicle device of the present disclosure is usable for a target vehicle equipped with a communication device that is capable of using a first line and a second line with respectively different communication methods for data transmission via a wireless network, and is capable of offloading data transmission from the first line to the second line. The vehicle device includes: an estimation information acquirer configured to acquire estimation information that enables estimation of an offloading wait time according to an encounter probability at which the target vehicle encounters an access point of the wireless network used as the second line; a wait time estimator configured to estimate the offloading wait time based on the estimation information acquired by the estimation information acquirer; and an offloading determiner configured to determine whether or not offloading is performable based on the offloading wait time estimated by the wait time estimator.

Further, in order to achieve the above object, a communication management method of the present disclosure according to a first aspect is usable in a target vehicle and implemented by at least one processor. The target vehicle is equipped with a communication device that is (i) capable of using a first line and a second line with respectively different communication methods for data transmission via a wireless network, and (ii) capable of offloading data transmission from the first line to the second line. The communication management method includes: an estimation information acquisition step of acquiring estimation information that enables estimation of an offloading wait time according to an encounter probability at which the target vehicle encounters an access point of the wireless network used in the second line; a wait time estimation step of estimating the offloading wait time based on the estimation information acquired by the estimation information acquisition step; and an offloading determination step of determining whether or not offloading is performable based on the offloading wait time estimated by the wait time estimation step.

According to the present disclosure, the offloading wait time is estimated based on an estimation information, which enables estimation of the offloading wait time, by an amount of which the target vehicle has to wait for offloading, and whether offloading is performable or not is determined based on the offloading wait time. Since the estimation information is based on the probability of the target vehicle to encounter an access point of the wireless network by using the second line, there is no need to preset or limit the travel route of the target vehicle. Further, since it is determined whether offloading is performable based on the offloading wait time, data that needs to be transmitted can be easily transmitted by offloading at a timing when offloading is performable. As a result, it is possible to improve the offloading rate regarding the transmission of data in the vehicle without limiting the vehicle's travel route or without presetting the vehicle's travel route.

Further, in order to achieve the above object, a server of the present disclosure includes:

an estimation information determiner configured to determine estimation information, which is information that enables estimation of an offloading wait time by an amount of which a target vehicle waits for offloading of data transmission from a first line to a second line, wherein the offloading wait time is determined according to an encounter probability of the target vehicle encountering an access point of a wireless network that is usable as the second line, and wherein the target vehicle is equipped with a communication device that is capable of using the first line and the second line with respectively different communication methods for the data transmission via the wireless network, and is capable of offloading the data transmission from the first line to the second line; and a transmission unit configured to transmit the estimation information determined by the estimation information determiner, to the target vehicle.

In order to achieve the above object, a communication management method of the present disclosure according to a second aspect is a method implemented by at least one processor. The communication management method includes:

an estimation information determination step of determining estimation information, which is information that enables estimation of an offloading wait time by an amount of which a target vehicle waits for offloading of data transmission from a first line to a second line, the offloading wait time being determinable according to an encounter probability of the target vehicle encountering an access point of a wireless network that is usable as the second line, wherein the target vehicle is equipped with a communication device that is (i) capable of using the first line and the second line with respectively different communication methods for the data transmission via the wireless network, and (ii) capable of offloading the data transmission from the first line to the second line; and a transmission step of transmitting the estimation information determined by the estimation information determination step, to the target vehicle.

According to the above-described configuration, the estimation information, which enables estimation of the offloading wait time, by an amount of which the target vehicle has to wait for before performing an offloading, is transmitted to the target vehicle. Since the estimation information is based on the probability of the target vehicle to encounter the access point of the wireless network by using the second line, there is no need to preset or limit the travel route of the target vehicle. Also, the target vehicle estimates the offloading wait time based on this estimation information. Then, since it is possible to determine whether offloading is performable based on the estimated offloading wait time, data that needs to be transmitted is easily transmittable by offloading at an offloading performable timing. As a result, it is possible to improve the offloading rate regarding the transmission of data in the vehicle without limiting the vehicle's travel route or without presetting the vehicle's travel route.

Multiple embodiments are described with reference to the drawings. For convenience of description, among multiple embodiments, a configuration having the same function as a configuration shown in the drawing and described in the previous embodiment may be indicated by the same reference symbol, and the description thereof may be omitted. For the configuration having the same reference symbol as in the previous embodiment, detailed description may be omitted in other embodiments.

First Embodiment

<Schematic Configuration of a Vehicle Communication System 1>

Hereinafter, a present embodiment is described with reference to the drawings. First, a vehicle communication system 1 is described with reference to FIG. 1. As shown in FIG. 1, a vehicle communication system 1 includes a center server (hereinafter CS) 2, a telecommunications carrier server (hereinafter TCS) 3 and a vehicle unit 4. A WBS in FIG. 1 indicates a wireless LAN base station. That is, the base station WBS corresponds to an access point of the wireless LAN. Hereinafter, the access point of the base station WBS may be abbreviated as AP. As the wireless LAN, for example, Wi-Fi (registered trademark) is used. When the wireless LAN is Wi-Fi, the base station WBS corresponds to a Wi-Fi spot. A WRC in FIG. 1 indicates a communication range of the base station WBS. A WLANCN in FIG. 1 indicates a wireless LAN controller. The wireless LAN controller is a controller configured to manage a plurality of base stations WBS. The wireless LAN controller is connected to, for example, the Internet and a plurality of base stations WBS. A CBS in FIG. 1 indicates a cellular base station for cellular communication. An IT in FIG. 1 indicates the Internet. An MPN in FIG. 1 indicates a mobile phone network.

The CS 2 is a server that communicates with a communication module 40 included in the vehicle unit 4, which will be described later. The CS 2 is assumed as connected to the Internet, for example. The CS 2 may consist of one server, or may consist of a plurality of servers. The CS 2 may be, for example, a server on the cloud, or may be a distributed network such as a block chain or the like. The CS 2 transmits information to the communication module 40 in response to a request from the communication module 40. Details of the CS 2 will be described later.

The TCS 3 is the carrier's server. A plurality of TCSs 3 may exist for different carriers. It is assumed that the TCS 3 is connected to the Internet, for example. The TCS 3 for one carrier may consist of one server or may consist of a plurality of servers. The TCS 3 may be, for example, a server on the cloud, or may be a distributed network such as block chain or the like. The TCS 3 holds information about APs managed by the telecommunications carriers (hereafter referred to as AP information). The AP information may be an SSID (Service Set Identifier) for identifying a telecommunications carrier, position coordinates, and the like for each of the APs managed by the telecommunications carrier. The position coordinates may be latitude and longitude.

The vehicle unit 4 can be used in a vehicle. In the present embodiment, as shown in FIG. 1, the vehicle unit 4 is assumed as used in a vehicle HV and a vehicle OV, for the following description. The vehicle HV is a target vehicle, and the vehicle OV is another vehicle other than the target vehicle. The vehicle unit 4 uses the communication module 40 included in the vehicle unit 4 to communicate with the CS 2 connected to a public communication network via a public communication network, a base station, and the like. Public communication networks include the above-mentioned Internet IT and the mobile phone network MPN. The communication module 40 is capable of performing two types of access methods for accessing the Internet IT.

The first access method uses cellular communication to connect to the base station CBS, and to further connect to the Internet IT via the mobile phone network MPN. A line used in this first access method is called as a first line. In the first access method, the mobile phone network MPN and the Internet IT respectively corresponds to a wireless network. If the communication module 40 connects directly to the base station CBS, the first line corresponds to a cellular line. In the following description, an example in which the communication module 40 is directly connected to the base station CBS is described. Note that the communication module 40 may be configured to indirectly connect to the base station CBS via a mobile terminal. Cellular communication includes LTE (Long Term Evolution), 5G, and the like.

The second access method is to use a wireless LAN to connect to the wireless LAN base station WBS, and to further connect to the Internet IT. The line used in this second access method is called as a second line. In the second access method, the Internet IT corresponds to a wireless network. When using Wi-Fi as the wireless LAN, the second line corresponds to the Wi-Fi line.

In the present embodiment, a range connectable to the wireless network using the first line is wider than a range connectable to the wireless network using the second line. The wireless network connectable range is an area in which connection with a base station of the wireless network is performable. In the present embodiment, it is assumed that a communication cost of the second line is lower than that of the first line. In the following description, it is assumed that the first line is LTE and the second line is Wi-Fi line.

When the communication module 40 is connectable to a network via wireless communication with the AP of the wireless network used as the second line, it is assumed that offloading is performable, which causes data to be transmitted using the second line instead of using the first line. In the following, transmitting data using the second line instead of transmitting data using the first line is called/designated as offloading. Details of the vehicle unit 4 are described later.

<Schematic Configuration of the CS 2>

The CS 2 includes, for example, a processor, a memory, an I/O, and a bus connecting these, and performs various processes related to a response to a request from the vehicle unit 4 by executing control programs stored in the memory. The memory mentioned here is a non-transitory, tangible storage medium, and stores programs and data that can be read by a computer. The non-transitory, tangible storage medium is implemented by a semiconductor memory or the like.

Figure 2:
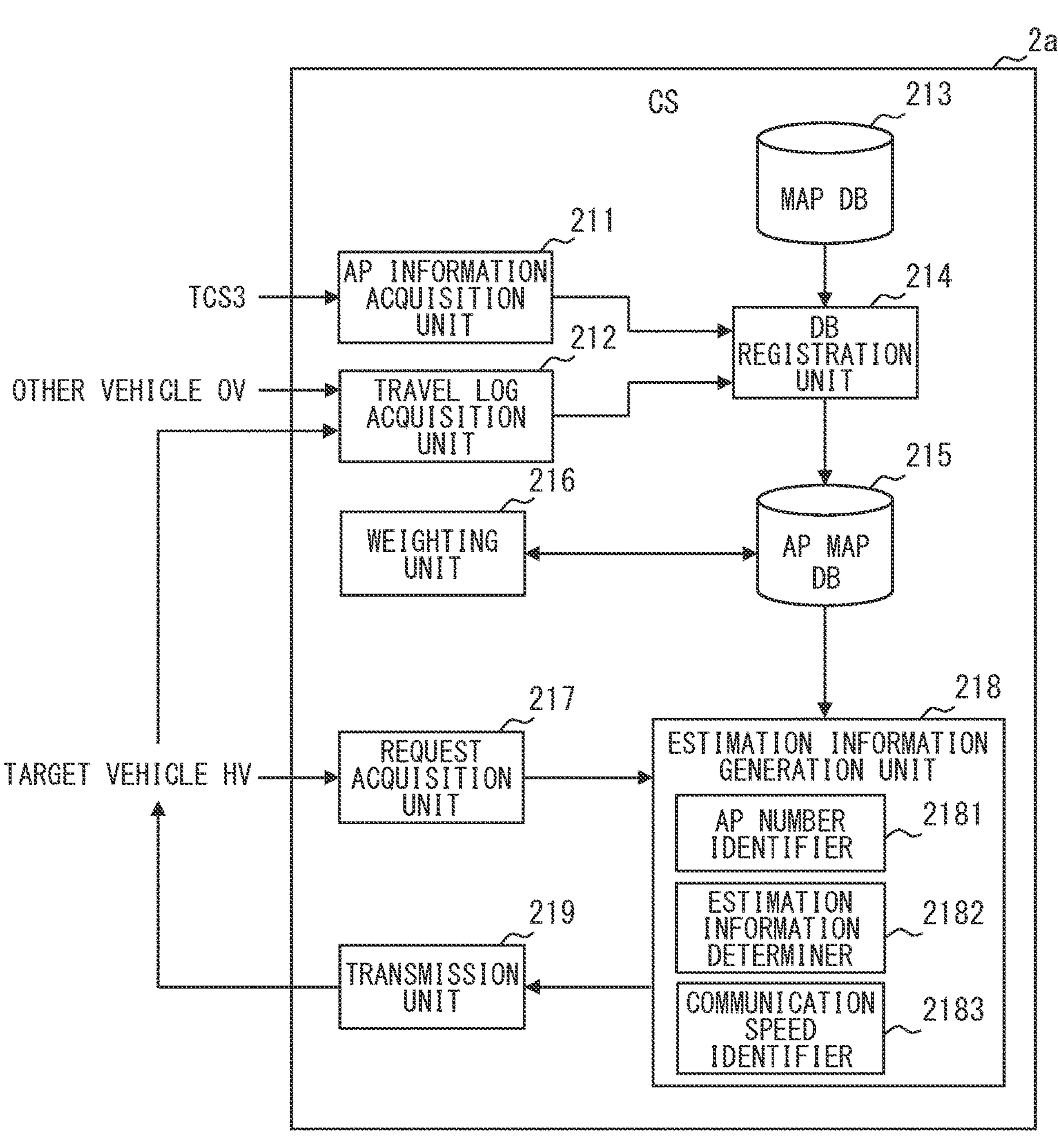
FIG. 2 is a diagram showing an example of a schematic configuration of a center server CS.

Next, a schematic configuration of the CS 2 is described with reference to FIG. 2. As shown in FIG. 2, the CS 2 includes an AP information acquisition unit 211, a travel log acquisition unit 212, a map database (hereinafter referred to as DB) 213, a DB registration unit 214, an AP map DB 215, a weighting unit 216, a request acquisition unit 217, an estimation information generation unit 218 and a transmission unit 219 as functional blocks. Part or all of the functions performed by the CS 2 may be configured as hardware using one or a plurality of ICs or the like. Also, part or all of the functional blocks provided by the CS 2 may be implemented as a combination of software executed by a processor and hardware members. This CS 2 corresponds to a server. Performing the processing of each of the functional blocks of the CS 2 by the computer corresponds to performing a communication management method.

The AP information acquisition unit 211 acquires the AP information from the TCS 3, for example. The AP information acquisition unit 211 should just acquire the AP information respectively from the TCS 3 of a plurality of communication carrier. The AP information acquisition unit 211 may be configured to acquire the AP information from the WLANCN when the WLANCN holds the AP information.

The travel log acquisition unit 212 acquires a log acquired by a travel of the vehicle (hereinafter referred to as a travel log). The travel log may be acquired from the vehicle unit 4 of the other vehicle OV. The travel log may be acquired from the vehicle unit 4 of the target vehicle HV. Acquisition of the travel log from the vehicle unit 4 may be performed on the second line while the communication module 40 of the vehicle unit 4 is connected to the AP of the base station WBS. It should be noted that the acquisition of the travel log from the vehicle unit 4 may also be performed on the first line.

An example of the travel log includes vehicle position information and information on communication on the second line when connecting to the AP (hereinafter referred to as second line communication information). The vehicle position information includes latitude, longitude, and altitude. The second line communication information includes BSSID (Basic Service Set Identifier), radio type, channel, RSSI, throughput, passing speed, passing time, and the like. The BSSID may be, for example, the MAC address of the connected AP. The passing speed may be an average value of vehicle speeds during connection with the AP. The passing speed may be the lowest value of the vehicle speed during connection with the AP. The passing time may be an elapsed time from the start of connection to the AP to the disconnection thereto. Transmission of the travel log from the vehicle unit 4 may be performed on the second line when reconnecting to the AP after disconnection with the AP that is a target of the second line communication information. Alternatively, transmission of the travel log from the vehicle unit 4 may be performed even on the first line after disconnection with the AP that is the target of the second line communication information. Note that the travel log may be configured to include a set of a vehicle position and a communication speed (hereinafter referred to as a first line communication speed) when communication is being performed on the first line.

The map DB 213 is a non-volatile memory, and stores map data such as link data, node data, POI (Points Of Interest) data and the like. It is assumed that the map data is divided into mesh units. As an example, each of the divided sections of the map data serving as a mesh is a unit section of the map data. A mesh is defined as one unit, which is acquired by dividing a map into a plurality of squares along latitude and longitude lines. A mesh code for identifying each mesh is associated with a mesh of the map data divided into mesh units. POI data is information about a point of interest. The POI data includes a name, an address, a position, attributes, and the like of a facility corresponding to the POI.

The DB registration unit 214 registers AP map information to the AP map DB 215 based on the AP information acquired by the AP information acquisition unit 211, the travel log acquired by the travel log acquisition unit 212, and the map data stored in the map DB 213. The AP map DB 215 is a non-volatile memory, and stores the AP map information about multiple APs.

Here, an example of the AP map information stored in the AP map DB 215 is described using FIG. 3. "Element" in FIG. 3 indicates an element of the AP map information. The values in FIG. 3 are the values for "Element" in FIG. 3. The value column in FIG. 3 is associated with a value of "Element" when the value has already been acquired. In FIG. 3, description of specific examples of values is omitted.

"FROM" in FIG. 3 indicates a source of acquisition of the elements of the AP map information. In case of "system," it indicates that it has automatically been generated by the CS 2. In case of "communication carrier," it indicates that it has been acquired from the TCS 3, or from the WLANCN. In case of "travel log," it indicates that it has been acquired as a travel log from the vehicle unit 4. As shown in the example in FIG. 3, elements of the AP map information include "AP_ID," "mesh code," "SSID," "BSSID," "radio type," "channel," "latitude," "longitude," "altitude," "RSSI," "throughput," "passing speed," "passing time," and "availability flag."

"AP_ID" is automatically generated by the CS 2. "AP_ID" is an ID assigned by the DB registration unit 214 for management. As "AP_ID," a different ID is assigned by the DB registration unit 214 for each of different APs. "Mesh code" is automatically generated by the CS 2. As the "mesh code," the DB registration unit 214 assigns a mesh code of the mesh where the AP is located based on the AP information and the map data.

As for "SSID," the DB registration unit 214 assigns an SSID of the communication carrier of the AP based on the AP information. For "BSSID," the DB registration unit 214 assigns a MAC address of the second line communication information of the target AP based on the travel log. For "radio type," the DB registration unit 214 assigns a type of wireless communication of the second line communication information of the target AP based on the travel log. For "channel," the DB registration unit 214 assigns a channel of the second line communication information of the target AP based on the travel log. For "latitude" and "longitude," the DB registration unit 214 assigns the latitude and longitude coordinates of the AP based on the AP information. As for the "altitude," the DB registration unit 214 assigns an altitude of the vehicle position corresponding to the target AP as the altitude of the AP based on the travel log.

For "RSSI," the DB registration unit 214 assigns an RSSI of the second line communication information of the target AP based on the travel log. For "throughput," the DB registration unit 214 assigns a throughput of the second line communication information of the target AP based on the travel log. For "passing speed," the DB registration unit 214 assigns a passing speed of the second line communication information of the target AP based on the travel log. When a plurality of travel logs exist for the same AP, the DB registration unit 214 may assign a value acquired by averaging the passing speeds of the plurality of travel logs as the passing speed. For "passing time," the DB registration unit 214 assigns a passing time of the second line communication information of the target AP based on the travel log. When a plurality of travel logs exist for the same AP, the DB registration unit 214 may assign a value acquired by averaging the passage times of the plurality of travel logs as the passage time.

"Availability flag" is automatically generated by the CS 2. As "availability flag," the DB registration unit 214 assigns a flag indicating whether or not an offloading is applicable based on the travel log. Whether or not an offloading is available is classified according to whether or not it is easy to perform communication on the second line. For example, when conditions that the RSSI is equal to or greater than an RSSI threshold, the throughput is equal to or greater than a throughput threshold, and the passing speed is equal to or less than a passing speed threshold are all satisfied, an availability flag of "1" may be assigned. On the other hand, when one of these conditions is not satisfied, a flag of "0" may be assigned indicating that the offloading is not available. The AP map information may also include a "type" element that indicates whether an AP is of a type that is connectable to the vehicle unit 4.

Further, the DB registration unit 214 adds, to the AP map information, record information indicating whether or not communication has been performed by using the second line. Whether or not communication has been performed by using the second line may be determined by whether or not a travel log of a type acquirable by connecting to the AP has been acquired as the AP map information. BSSID and the like are examples of the type of travel log acquirable by connecting to the AP.

Further, it is preferable that the DB registration unit 214 stores the AP map information in the AP map DB 215 narrowing a scope of APs down to APs with a high communication probability. That is, it is preferable that the DB registration unit 214 stores the AP map information in the AP map DB 215 by narrowing a scope of APs down to the ones in a type of facility having the communication range within which the vehicle is estimated as likely to stop. According to the above, it is possible to narrow down target APs with a high communication probability, thereby further improving offload efficiency, which is described later. For example, a convenience store may be the type of facility where the vehicle is estimated as likely to stop within the communication range thereof. This is because convenience stores are used for temporary breaks, making it easier for a vehicle to stop. Further, convenience stores are often provided at intersections, and it is easy to stop at a position close to the convenience stores. The DB registration unit 214 may select, based on the attribute in the POI data, an AP near the facility having an attribute indicating a convenience store. The term "near" in this context may indicate a position which is guaranteeably close to an AP, i.e., a position within the communication range of an access point.

The weighting unit 216 weights the AP map information stored in the AP map DB 215. In other words, the weighting unit 216 weights APs whose AP map information is stored in the AP map DB 215. Weighting may be, for example, a coefficient of 1 or less. Weighting information may be added to AP map information, for example.

The weighting unit 216 preferably weights an AP that has performed communication with a vehicle (communication record, hereinafter) more heavily than an AP that does not have performed communication with a vehicle. For example, a weight of "1" may be set for an AP whose AP map information includes information indicating that the AP has a communication record. On the other hand, the weight may be set to "0.5" for an AP whose AP map information includes information indicating no communication record.

The weighting unit 216 preferably increases the weighting of an AP as the average passing speed of a vehicle passing through the AP lowers. About the average passing speed of the vehicle which passes through an AP, it may be determinable from the passing speed of the AP map information stored in the AP map DB 215. For example, an AP whose passing speed is less than a predetermined value may be given a weight of "1." On the other hand, for an AP whose passing speed is equal to or greater than the predetermined value, a weight may be set to "0.5." It should be noted that the weight may be changed in three or more levels according to the passing speed.

The weighting unit 216 may be configured to perform weighting according to (a) whether there is a communication record or (b) the average passing speed. When the weighting unit 216 performs weighting according to both of the communication record and the average passing speed, for example, a value acquired by multiplying the two weighting coefficients may be used as the weighting.

When a request for mesh information is transmitted from the communication module 40 of the vehicle unit 4, the request acquisition unit 217 acquires such a request (may be designated as a request for mesh information, hereinafter). The request for mesh information may be configured to be transmitted via the first line, for example. The request for mesh information may include a request for (i) a vehicle position and (ii) a mesh code of a mesh, regarding which the mesh information and a vehicle position of the target vehicle HV using the requesting vehicle unit 4 are already cached.

Figure 4:
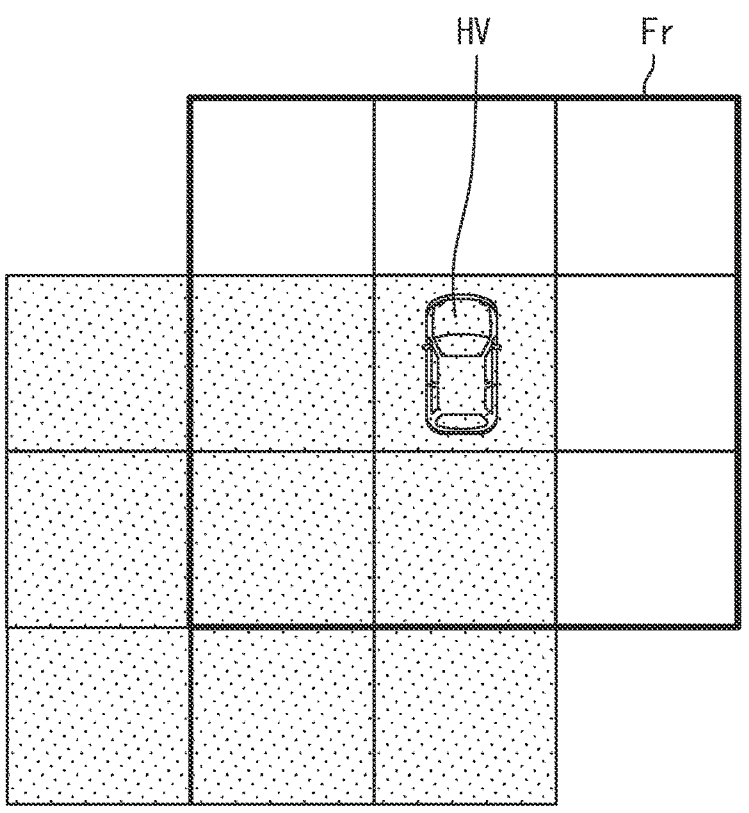
FIG. 4 is a diagram for explaining an example of determination of meshes for which mesh information is generated.

The estimation information generation unit 218 generates the mesh information as estimation information when the request acquisition unit 217 acquires a request for mesh information. The estimation information generation unit 218 identifies a target mesh for which mesh information is to be generated, based on information included in the request for mesh information. Here, an example of determination of a mesh or meshes for which mesh information is generated by the estimation information generation unit 218 is described with reference to FIG. 4. A rectangle in FIG. 4 indicates a mesh. A shaded rectangle indicates a mesh whose mesh information has already been cached. From the vehicle position of the target vehicle HV, the estimation information generation unit 218 identifies nine meshes, including a mesh where the target vehicle HV is located and other meshes around it. In the example of FIG. 4, nine meshes enclosed by a frame denoted by Fr are identified. Subsequently, the estimation information generation unit 218 selects meshes, excluding meshes for which mesh information has already been cached, among the nine meshes as targets of mesh information generation. In the example of FIG. 4, five meshes other than shaded meshes whose mesh information has already been cached are determined as mesh information generation targets.

The estimation information generation unit 218 has an AP number identifier 2181 (i.e., AP number identifying unit), an estimation information determiner 2182 (i.e., estimation information determining unit), and a communication speed identifier 2183 (i.e., communication speed identifying unit) as sub-functional blocks. The AP number identifier 2181 identifies the number of APs in each mesh. The AP number identifier 2181 identifies the number of APs in each of target meshes for which mesh information is to be generated. Identification of the number of APs in the mesh may be performed, for example, as follows. The AP number identifier 2181 extracts AP map information having the same mesh code as the target mesh from among the AP map information stored in the AP map DB 215. In the present embodiment, the AP number identifier 2181 identifies the number of APs in the mesh, narrowing down to a scope of the APs existing in a type of facility having a communication range within which the vehicle is estimated as likely to stop. The vehicle mentioned here is a vehicle including, i.e., with no distinction between, the target vehicle HV and the other vehicle OV.

Subsequently, the AP number identifier 2181 identifies the sum of the weights given by the weighting unit 216 to the extracted AP map information as the number of APs in the mesh. In other words, the AP number identifier 2181 performs the weighting given by the weighting unit 216 to identify the number of APs in the mesh. For example, in case that the weights are "1," "1," "0.5," "0.5," "1," the actual number of APs in the mesh is 5, but the number of APs is identified as 4. As an example, the AP number identifier 2181 identifies the number of APs in the mesh by assigning a greater weight to an AP that has a communication record with a vehicle than an AP that has no communication record with a vehicle. As another example, the AP number identifier 2181 identifies the number of APs in the mesh by increasing the weighting of the APs as the average passing speed of vehicles passing through the APs lowers. According to the above, it becomes possible to more accurately identify the number of APs in the mesh to which offloading is performable.

The estimation information determiner 2182 determines estimation information capable of estimating a wait time until offloading (hereinafter referred to as an offloading wait time) according to an encounter probability of the target vehicle HV encountering an AP. The processing in this estimation information determiner 2182 corresponds to an estimation information determination step. The estimation information determiner 2182 determines the wait time estimated to be required for using the second line for each mesh (hereinafter referred to as an area-specific wait time) as estimation information according to the encounter probability. The estimation information determiner 2182 may determine the area-specific wait time according to the encounter probability of the target vehicle HV encountering the AP using information about AP distribution. The estimation information determiner 2182 may determine the area-specific wait time according to the number of APs identified by the AP number identifier 2181 for each mesh. In other words, the area-specific wait time is determined according to an AP density within a mesh. Both of the number of APs for each mesh and the density of APs within a mesh correspond to information about the AP distribution. A mesh corresponds to a predetermined unit section. Here, an example is shown in which a mesh is used as a unit section for determining the area-specific wait time, but a unit section other than a mesh may also be used.

Figure 5:
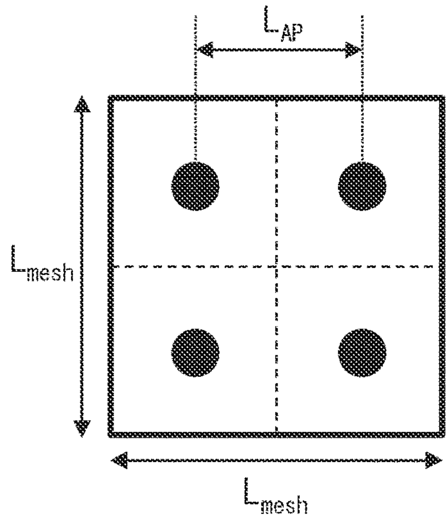
FIG. 5 is a diagram for explaining an example of a method of determining an area-specific wait time.

Here, an example of a method for determining the area-specific wait time is described with reference to FIGS. 5 and 6. The estimation information determiner 2182 calculates a distance between adjacent APs when it is assumed that APs by the number identified by the AP number identifier 2181 are arranged in the mesh at equal intervals. In an example of FIG. 5, rectangles indicate meshes. Black circles indicate positions of virtual APs. Lmesh is a dimension of one side of a square mesh. LAP is a distance between adjacent APs. The estimation information determiner 2182 determines a value acquired by dividing the distance between adjacent APs by a reference speed as the area-specific wait time. An example of an equation for calculating the area-specific wait time is shown in FIG. 6. Twifi_defA in FIG. 6 represents the area-specific wait time. Vbase in FIG. 6 represents the reference speed. n in FIG. 6 represents the number of APs. In the equation of FIG. 6, the value acquired by dividing Lmesh by the square root of the number of APs corresponds to the distance LAP between adjacent APs. The estimation information determiner 2182 may perform the above-described calculation for each of the target meshes determined for generation of the mesh information. For areas where the number of APs identified by the AP number identifier 2181 is 0, an invalid value may be determined as the area-specific wait time.

As for the reference speed, it is preferable to use tan average speed of the vehicles acquired from the travel logs of the target mesh. According to the above, by using a value closer to an actual travel speed for each mesh, it is possible to determine the area-specific wait time with higher accuracy. For the reference speed, for example, a fixed value preset as the average speed of a general vehicle may be used.

The communication speed identifier 2183 identifies a representative value of the first line communication speed for each of the target meshes determined for generation of the mesh information. The communication speed identifier 2183 may identify the representative value of the first line communication speed based on the first line communication speed acquired by the travel log acquisition unit 212, for example. The representative value of the first line communication speed may be an average value of the first line communication speeds within the mesh targeted by the associated vehicle position. The representative value of the first line communication speed is not limited to the average value described above, but may also be a mode value, a median value, or the like.

The estimation information generation unit 218 generates, as the mesh information, data including the area-specific wait time determined by the estimation information determiner 2182 and the representative value of the first line communication speed identified by the communication speed identifier 2183. The mesh information may be generated for each mesh, and may include the mesh code and a validity period. The validity period is a period of time for caching (i.e., holding/storing) the mesh information in the vehicle unit 4. The validity period may be set arbitrarily. The validity period should be set to such a period that mesh information of the same mesh does not have to be generated repeatedly in a short period of time. Even if the aforementioned invalid value is determined as the area-specific wait time, this invalid value is included in the mesh information.

The transmission unit 219 transmits the mesh information generated by the estimation information generation unit 218 to the vehicle unit 4 of the target vehicle HV that has transmitted the request for mesh information. That is, the transmission unit 219 transmits the estimation information determined by the estimation information determiner 2182 to the target vehicle HV. The above-described processing in the transmission unit 219 corresponds to a transmission step.

<Mesh Information Transmission Related Processing in the CS 2>

Figure 7:
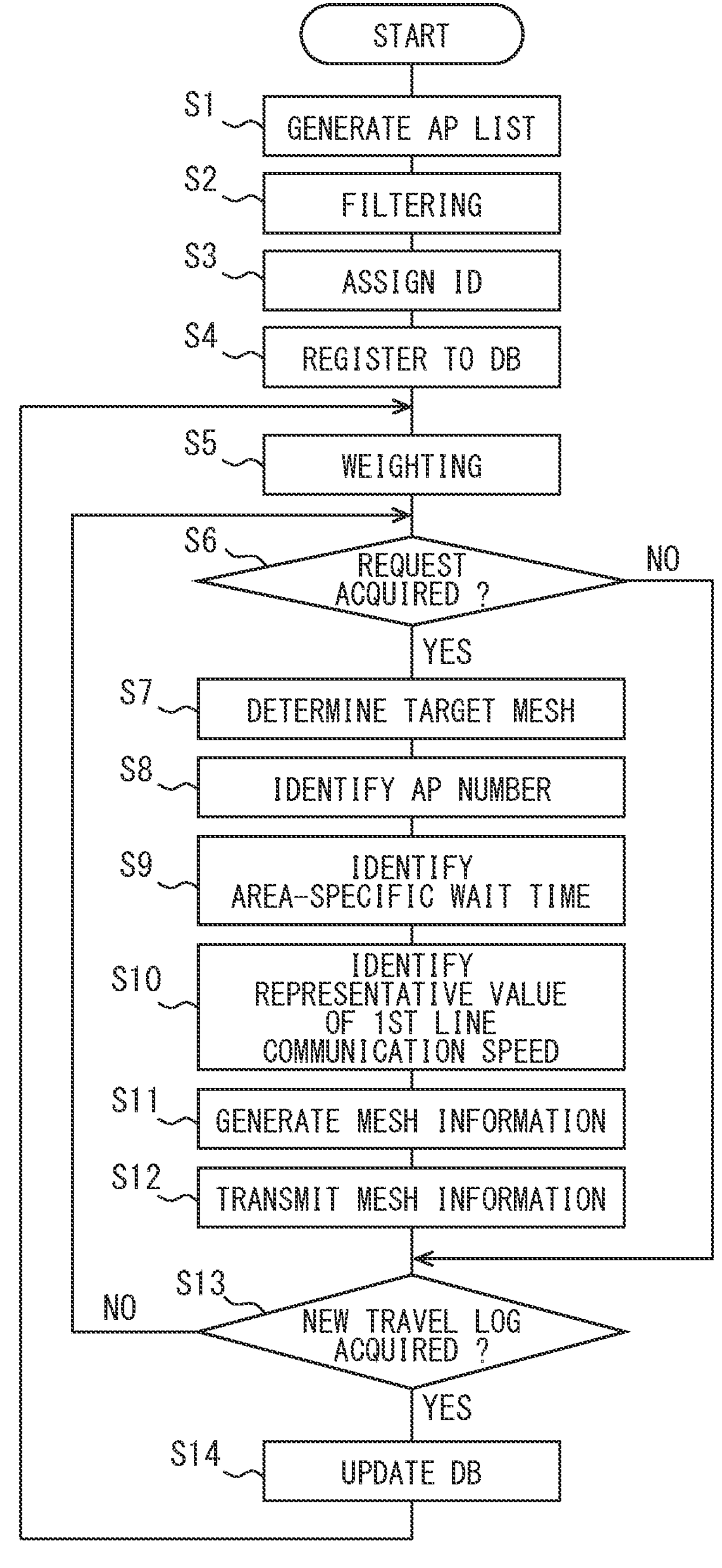
FIG. 7 is a flowchart showing an example of a flowchart of a mesh information transmission related process in the center server CS.

Here, an example of the flow of processing related to mesh information transmission in the CS 2 (hereinafter referred to as mesh information transmission related processing) is described using a flowchart of FIG. 7.

First, in step S1, the DB registration unit 214 generates an AP list from the AP information acquired by the AP information acquisition unit 211. The AP list may be a list of position coordinates and SSIDs for each AP, for example.

In step S2, the DB registration unit 214 narrows down (i.e., filters) the AP list, or a scope of APs, to APs existing in the type of facility having a communication range within which the vehicle is estimated as likely to stop, and stores the information of the narrowed-down AP list in the AP map DB 215. That is, a DB is generated. In step S2, the latitude, longitude, and SSID of respective APs are stored in the AP map DB 215 among the AP map information.

In step S3, the DB registration unit 214 assigns an ID as the AP map information stored in the AP map DB 215. The assigned IDs are the aforementioned "AP_ID" and "mesh code." For the mesh code, the same value as the mesh code used for the mesh of the map data stored in the map DB 213 may be assigned.

In step S4, the DB registration unit 214 uses the travel log acquired by the travel log acquisition unit 212 to store the values of the elements of the AP map information that have not been stored in the AP map DB 215. For example, "BSSID," "radio type," "channel," "RSSI," "throughput," "passing speed," "passing time," and "availability flag" are stored. DB registration is performed in such manner. In step S5, the weighting unit 216 weights the AP map information stored in the AP map DB 215.

In step S6, when the request acquisition unit 217 acquires a request for mesh information (YES in S6), the process proceeds to step S7. On the other hand, if the request acquisition unit 217 has not acquired a request for mesh information (NO in S6), the process proceeds to step S13.

In step S7, the estimation information generation unit 218 identifies target meshes for which mesh information is to be generated, based on the information included in the request for mesh information. In step S8, the AP number identifier 2181 identifies the number of APs in each mesh identified in step S7.

In step S9, the estimation information determiner 2182 determines the area-specific wait time using the number of APs identified in step S8. In step S10, the communication speed identifier 2183 identifies a representative value of the first line communication speed for each mesh identified in step S7. The processing of S10 may be performed before the processing of steps S8 to S9. The processing of S10 may be performed in parallel with the processing of steps S8 to S9.

In step S11, the estimation information generation unit 218 generates, as mesh information, data including the area-specific wait time determined in step S9 and the representative value of the first line communication speed identified in step S10. In step S12, the transmission unit 219 transmits the mesh information generated in step S11 to the vehicle unit 4 of the target vehicle HV that has transmitted the request for mesh information.

In step S13, when a new travel log is acquired by the travel log acquisition unit 212 (YES in S13), the process proceeds to step S14. On the other hand, if the travel log acquisition unit 212 has not acquired a new travel log (NO in S13), the process returns to step S6, and repeats the processing.

In step S14, the DB registration unit 214 updates the DB. In the DB update, the DB registration unit 214 updates the AP map information stored in the AP map DB 215 with the information of the newly acquired travel log. Then, the process returns to step S5, and repeats the processing. When returning to step S5 to repeat the processing, the processing of step S5 may be skipped to go on to the processing from step S6 onwards, if the change of weighting is unnecessary. Note that the mesh information transmission related processing may be configured to periodically re-started from the processing of S1.

<Schematic Configuration of the Vehicle Unit 4>

Next, a schematic configuration of the vehicle unit 4 is described with reference to FIG. 8. As shown in FIG. 8, the vehicle unit 4 includes a communication module 40, a locator 41, a map DB 42, and a vehicle sensor 43. The communication module 40, the locator 41, the map DB 42, and the vehicle sensor 43 may be connected to each other, for example, via an in-vehicle LAN.

The locator 41 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 41 identifies a vehicle position and a traveling direction of an own vehicle. For example, the locator 41 sequentially identifies the vehicle position of the own vehicle by combining the positioning signal received by the GNSS receiver and the measurement result of the inertial sensor. Note that the vehicle position may be measured based on a traveling distance acquired from detection results sequentially output from a vehicle speed sensor mounted on the own vehicle, and the like. The locator 41 may identify coordinates of latitude, longitude, and altitude as the vehicle position. For example, the locator 41 may identify the traveling direction of the own vehicle using the least squares method based on the vehicle positions that are sequentially identified. Alternatively, the locator 41 may also identify the traveling direction of the own vehicle from the positioning signal. In such case, the Doppler shift amount of the carrier wave is generated from the positioning signal. Subsequently, the north speed and east speed of the own vehicle are calculated from this Doppler shift amount. Then, the traveling direction of the own vehicle can be calculated by vector synthesis of the north speed and the east speed.

The map DB 42 is a non-volatile memory, and stores map data such as link data and node data. It is assumed that the map data is divided into mesh units. As an example, each of the divided sections of the map data serving as a mesh is a unit section of the map data. A mesh code for identifying each mesh is associated with a mesh of the map data divided into mesh units.

The vehicle sensor 43 is a group of sensors for detecting various states of the own vehicle. As the vehicle sensor 43, includes a vehicle speed sensor that detects the vehicle speed of the own vehicle, and the like. The vehicle sensor 43 outputs the detected sensing information to the in-vehicle LAN. Sensing information detected by the vehicle sensor 43 may be configured to be output to the in-vehicle LAN via an ECU mounted on the vehicle.

The communication module 40 connects to a network via wireless communication. The communication module 40 communicates with the CS 2 via a public communication network, a base station, and the like. Details of the communication module 40 are provided in the following.

<Schematic Configuration of the Communication Module 40>

Next, a schematic configuration of the communication module 40 is described with reference to FIG. 8. As shown in FIG. 8, the communication module 40 includes a control unit 400, a Wi-Fi communication unit (hereinafter referred to as WF communication unit) 420 and a cellular communication unit (hereinafter referred to as CL communication unit) 440. This communication module 40 corresponds to a communication device.

The WF communication unit 420 connects to the Internet IT via the Wi-Fi base station WBS. The WF communication unit 420 communicates with the CS 2 via the base station WBS and the Internet IT.

The CL communication unit 440 connects to the Internet IT via the cellular communication base station CBS and the mobile phone network MPN. The CL communication unit 440 communicates with the server 2 via the Internet IT. That is, the CL communication unit 440 communicates with the CS 2 via the base station CBS, the mobile phone network MPN, and the Internet IT.

The control unit 400 includes, for example, a processor, a memory, an I/O, and a bus connecting these, and executes various processes related to control of data transmission/reception by executing a control program stored in the memory. The memory mentioned here is a non-transitory, tangible storage medium, and stores programs and data that can be read by a computer. The non-transitory, tangible storage medium is implemented by a semiconductor memory or the like. Details of the control unit 400 is described below.

<Schematic Configuration of the Control Unit 400>

Next, a schematic configuration of the control unit 400 is described with reference to FIG. 8. As shown in FIG. 8, the control unit 400 includes a managing unit 401, a requester 402 (i.e., requesting unit), an estimation information acquirer 403 (i.e., estimation information acquiring unit), a mesh information holder 404 (i.e., mesh information holding unit), a wait time estimator 405 (i.e., wait time estimating unit), a communication speed identifier 406 (i.e., communication speed identifying unit), a stop time measurer 407 (i.e., stop time measuring unit), an offloading determiner 408 (i.e., offloading determining unit), and a transmission determiner 409 (i.e., transmission determining unit) as functional blocks. Part or all of the functions performed by the control unit 400 may be configured as hardware using one or a plurality of ICs or the like. Also, part or all of the functional blocks provided by the control unit 400 may be implemented as a combination of software executed by a processor and hardware members. This control unit 400 corresponds to a vehicle device. Execution of the processing of each functional block of the control unit 400 by the computer corresponds to performing the communication management method.

The managing unit 401 manages data transmitted by the communication module 40. For example, the managing unit 401 holds data to be transmitted by the communication module 40 in a volatile memory. The data transmitted by the communication module 40 includes data subject to a request for transmission from an end ECU of the own vehicle. It is assumed that the managing unit 401 manages a communication data size subject to the request for transmission, an allowable transmission start wait time (allowable transmission latency, hereinafter), and a data holdable time of the data which is subject to the request for transmission. The allowable transmission latency is an allowable time to wait for the transmission of data. The allowable transmission latency is determined according to the characteristics of data. A shorter allowable transmission latency is set for information with a higher degree of urgency. The data holdable time is a grace period during which data can be cached. The data holdable time is determined according to a capacity of the memory that caches the data waiting for transmission.

Note that the data to be transmitted by the communication module 40 may include the aforementioned travel log. The vehicle position in the travel log may be acquired from the locator 41. The BSSID, radio type, channel, RSSI, and throughput in the travel log can be acquired from the WF communication unit 420 connected to the AP. The passing speed in the travel log can be identified from the detection result of the vehicle speed sensor included in the vehicle sensor 43. The passage time in the travel log can be identified from a connection time with the AP via the WF communication unit 420.

The requester 402 causes the CS 2 to transmit a request for the mesh information. This request may be transmitted from the CL communication unit 440 to the CS 2 on the first line. The requester 402 transmits a request for the mesh information to the CS 2, for example, when it detects that the own vehicle is traveling across the mesh. Traveling across the mesh refers to switching of the mesh where the vehicle is located (hereinafter referred to as a current mesh). The requester 402 may determine an across-the-mesh travel of the own vehicle from the vehicle position acquired from the locator 41 and the map data acquired from the map DB 42.

The request for mesh information may include a request for (i) a vehicle position and (ii) a mesh code of the mesh, regarding which the mesh information and a vehicle position of the target vehicle HV, which is the own vehicle, have already been cached. The vehicle position of the own vehicle may be acquired from the locator 41. As for the mesh code, the mesh code of a mesh whose mesh information has already been cached in the mesh information holder 404, which is described later, may be used.

The estimation information acquirer 403 acquires mesh information transmitted from the CS 2 in response to a request for mesh information. The processing in this estimation information acquirer 403 corresponds to an estimation information acquisition step. The estimation information acquirer 403 may acquire the mesh information transmitted on the first line via the CL communication unit 440. The mesh information includes the area-specific wait time, which is the estimation information. The estimation information acquirer 403 acquires the mesh information of the meshes around the current mesh other than the meshes whose mesh information has already been cached.

The mesh information holder 404 temporarily holds the mesh information acquired by the estimation information acquirer 403 during the validity period included in the mesh information. In other words, the mesh information is cached. The mesh information holder 404 may be a volatile memory.

The wait time estimator 405 estimates the offloading wait time based on the mesh information held in the mesh information holder 404. In other words, the offloading wait time is estimated based on the area-specific wait time acquired by the estimation information acquirer 403. The wait time estimator 405 may be configured to estimate the offloading wait time when a data transmission request comes in from the end ECU. The processing in this wait time estimator 405 corresponds to a wait time estimation step.

For example, the offloading wait time can be estimated as follows. First, the wait time estimator 405 identifies a wait time estimated to be required for using the second line (hereinafter referred to as a second line wait time). The wait time estimator 405 determines whether there is a valid area-specific wait time for the current mesh based on the area-specific wait time included in the mesh information. An invalid area-specific wait time refers to the invalid value described above.

Figure 9:
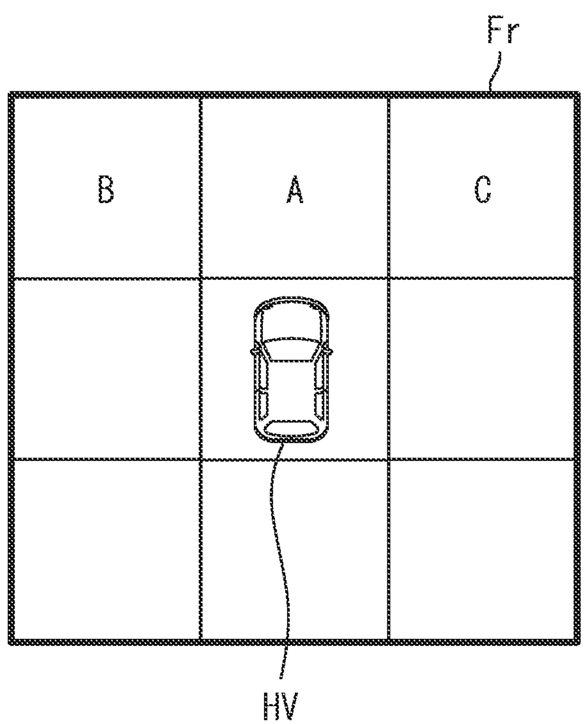
FIG. 9 is a diagram showing an example of meshes around a current mesh.

Then, if there is a valid area-specific wait time for the current mesh, this area-specific wait time is identified as the second line wait time. This is called as a first pattern. On the other hand, if there is no valid area-specific wait time for the current mesh, the second line wait time is identified according to the traveling direction of the own vehicle. As a specific example, the second line wait time is identified as the sum of (i) the average value of the area-specific wait times of the meshes around the current mesh and (ii) the passing time of the current mesh. This is called as a second pattern. For example, as the meshes around the current mesh, as shown in FIG. 9, three meshes in the traveling direction of the own vehicle may be targeted. More specifically, regarding the current mesh, three meshes are targeted, i.e., a straight front mesh (mesh A in FIG. 9), a left-front mesh (mesh B in FIG. 9), and a right-front mesh (mesh C in FIG. 9). The traveling direction of the own vehicle may be acquired from the locator 41. The passing time of the current mesh may be estimated based on the vehicle speed of the own vehicle and the distance from the vehicle position of the own vehicle to a boundary of the current mesh. As the vehicle speed of the own vehicle, for example, an average vehicle speed in the past for a certain period of time may be used. For the distance from the vehicle position to the boundary of the current mesh, for example, an average value of linear distances to the boundary of the three meshes in the traveling direction described above may be used.

Subsequently, the wait time estimator 405 estimates the offloading wait time using the identified second line wait time. It is preferable that the wait time estimator 405 corrects an estimation of the offloading wait time to be a shorter time, as the first line communication speed identified by the communication speed identifier 406 lowers. According to the above, it is possible to avoid a problem of delaying a data transmission for too much time for offloading, i.e., only to miss a chance of normally completable data transmission within a required time even on the first line. The communication speed identifier 406 may identify the first line communication speed from the representative value of the first line communication speed in the mesh information held in the mesh information holder 404. When the communication speed identifier 406 may identify the second line wait time in the first pattern, the representative value of the first line communication speed of the current mesh may be identified as the first line communication speed. When the second line wait time is identified in the second pattern, the communication speed identifier 406 may identify, as the first line communication speed, an average value the representative values of the first line communication speed of (i) the current mesh and (ii) the mesh used to identify the second line wait time.

The wait time estimator 405 may estimate, for example, a value calculated according to an equation shown in FIG. 10 as the offloading wait time. Tsend_delay in FIG. 10 represents the offloading wait time. Twifi_def in FIG. 10 represents the second line wait time. Dsent in FIG. 10 represents the communication data size of the data subject to a request for transmission. Ssent in FIG. 10 represents the first line communication speed. Tv0 in FIG. 10 represents a stop time. The communication data size may be acquired from the managing unit 401. As shown in FIG. 10, the wait time estimator 405 may estimate the offloading wait time by adding (i) a value acquired by dividing the communication data size by the first line communication speed to (ii) the second line wait time. Tv0 may be set to 0 by default. In other words, an initial value of the offloading wait time when triggering an estimation of the offloading wait time upon receiving a request for data transmission from the end ECU may be calculated by setting Tv0 to 0.

The wait time estimator 405 corrects and identifies the offloading wait time as a longer time, as the stop time measured by the stop time measurer 407 increases. Since the second line wait time is a value when it is assumed that the own vehicle is traveling, the accuracy of the offloading wait time lowers as the stop time of the own vehicle increases. On the other hand, according to the above configuration, it is possible to improve the accuracy of the offloading wait time. The stop time measurer 407 may measure the stop time of the own vehicle from changes in the value of the vehicle speed sensor. The wait time estimator 405 may correct the initial value of the offloading wait time estimated by setting Tv0 to 0, by using the stop time measured by the stop time measurer 407 as the value of Tv0 in FIG. 10. Until the estimation information acquirer 403 acquires new mesh information, the wait time estimator 405 corrects the offloading wait time to be longer as the vehicle stop time becomes longer. It should be noted that the control unit 400 may be configured not to include the stop time measurer 407 and not to perform correction based on the stop time, delegating the estimation of the offloading wait time to the wait time estimator 405.

The offloading determiner 408 determines whether offloading is performable based on the offloading wait time estimated by the wait time estimator 405. The processing by the offloading determiner 408 corresponds to an offloading determination step. The offloading determiner 408 may determine whether offloading is performable based on the offloading wait time estimated by the wait time estimator 405, the allowable transmission latency of the data requested to be transmitted, and the data holdable time. For example, if the offloading wait time is smaller than the minimum value (i.e., a smaller value) among the allowable transmission latency and the data holdable time, it may be determined that offloading is performable. FIG. 11 shows such a condition. Tsendallow_delay in FIG. 11 represents the allowable transmission latency. Tstore_lim in FIG. 11 represents the data holdable time. On the other hand, if the offloading wait time is equal to or greater than the minimum value of the allowable transmission latency and the data holdable time, it may be determined that offloading is impossible.

The transmission determiner 409 determines whether or not to transmit data for which transmission is requested. If the offloading determiner 408 determines that the offloading is impossible, the transmission determiner 409 causes the data to be transmitted on the first line. That is, the CL communication unit 440 is caused to transmit the data. On the other hand, when the offloading determiner 408 determines that offloading is performable, the transmission determiner 409 determines to wait for a timing of offloading in standby for a duration of the offloading wait time estimated by the wait time estimator 405, i.e., by not transmitting the data on the first line, for the purpose of performing offloading. In one example, the following configuration may be adoptable.

When the offloading determiner 408 determines that offloading is performable, the transmission determiner 409 sets an expiration timer, and waits for data transmission on the first line until a count value of the expiration timer satisfies an expiration condition. The expiration timer counts elapsed time. For example, the expiration condition may be that the count value of the expiration timer becomes greater than the minimum value among the allowable transmission latency and the data holdable time.

Also, as shown in an equation of FIG. 12, the condition may more preferably be that the count value of the expiration timer becomes greater than a value acquired by (i) dividing the communication data size by the first line communication speed and (ii) subtracting such value from the minimum value described above. In other words, it is preferable that the transmission determiner 409 shortens the grace period for delaying data transmission on the first line as the first line communication speed identified by the communication speed identifier 406 lowers. Tdelay_count in FIG. 12 represents the count value of the expiration timer. As the value acquired by dividing the communication data size by the first line communication speed, a value acquired by the wait time estimator 405 may be used. According to the above, it is possible to avoid a problem of delaying a data transmission for too much time for offloading, i.e., only to miss a chance of normally completable data transmission within a required time even on the first line.

When the WF communication unit 420 is connected to an AP during a standby time of not transmitting the data on the first line, the transmission determiner 409 causes the data to be transmitted on the second line. In other words, an offloading is performed. On the other hand, when the count value of the expiration timer satisfies the expiration condition, the transmission determiner 409 causes the data to be transmitted on the first line.

When the offloading wait time for the same data is newly estimated due to a travel across a mesh boundary, the following may follow. The offloading determiner 408 re-determines whether offloading is performable based on the newly-estimated offloading wait time. Then, in case of determining that an offloading is impossible, the data is transmitted on the first line. On the other hand, when it is determined that offloading is performable, the transmission determiner 409 re-determines whether or not the count value satisfies the expiration condition without resetting the count value of the expiration timer. Then, upon satisfaction of the expiration condition, the data is transmitted on the first line.

<Mesh Information Acquisition Related Processing in the Control Unit 400>

Figure 13:
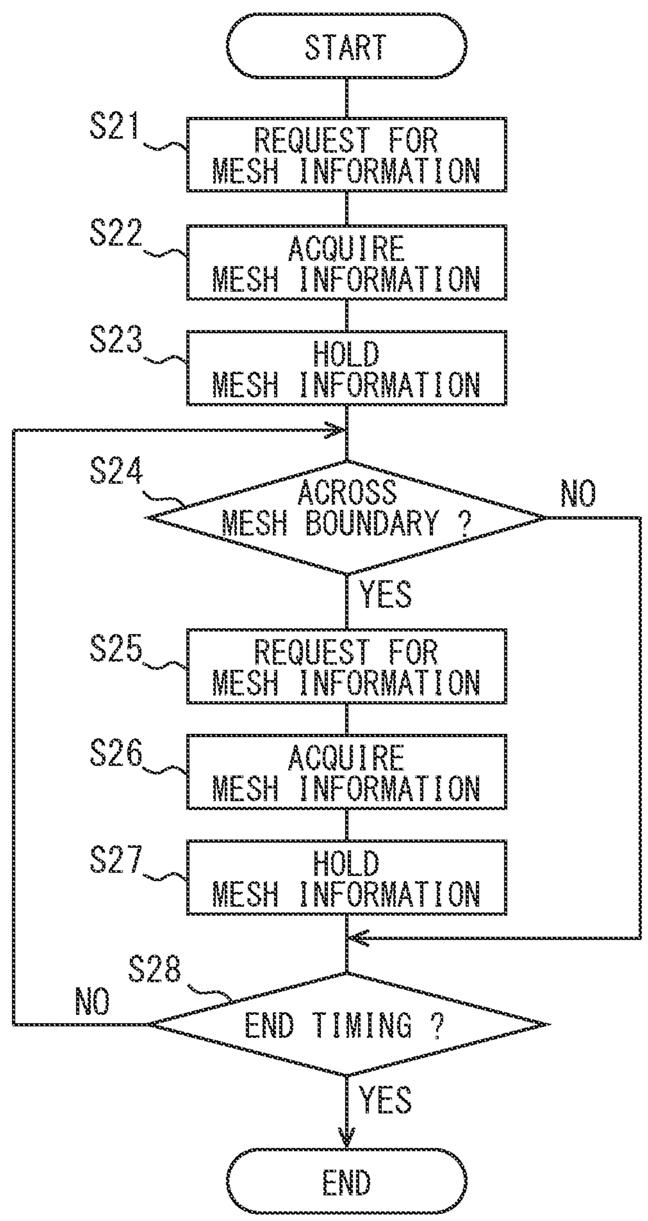
FIG. 13 is a flowchart showing an example of a flow of a mesh information acquisition related process in the control unit.

Next, an example of the flow of processing related to mesh information acquisition in the control unit 400 (hereinafter referred to as mesh information acquisition related processing) is described using a flowchart of FIG. 13. The flowchart of FIG. 13 may be configured to start when a switch (hereinafter referred to as a power switch) for starting an internal combustion engine or a motor generator of the own vehicle HV is turned on.

First, in step S21, the requester 402 causes the CS 2 to transmit a request for mesh information. In step S22, the estimation information acquirer 403 acquires mesh information transmitted from the CS 2. In step S23, the estimation information acquirer 403 temporarily holds the mesh information acquired in step S22 in the mesh information holder 404. The mesh information held in the mesh information holder 404 is deleted when the validity period included in the mesh information expires.

In step S24, when the requester 402 detects that the own vehicle has traveled across the mesh boundary (YES in S24), the process proceeds to step S25. On the other hand, when the requester 402 does not detect an across-boundary travel of the own vehicle (NO in S24), the process proceeds to step S28. In step S25, the requester 402 causes the CS 2 to transmit a request for mesh information. In step S26, the estimation information acquirer 403 acquires the mesh information transmitted from the CS 2. In step S27, the estimation information acquirer 403 temporarily holds, in the mesh information holder 404, the mesh information acquired in step S26.

In step S28, when it is an end timing of the mesh information acquisition related processing (YES in S28), the mesh information acquisition related processing ends. The end timing of the mesh information acquisition related processing may be a timing when the power switch is turned off. On the other hand, when it is not the end timing of the mesh information acquisition related processing (NO in S28), the process returns to step S24, and the process repeats.

<Offloading Related Processing in the Control Unit 400>

Figure 14:
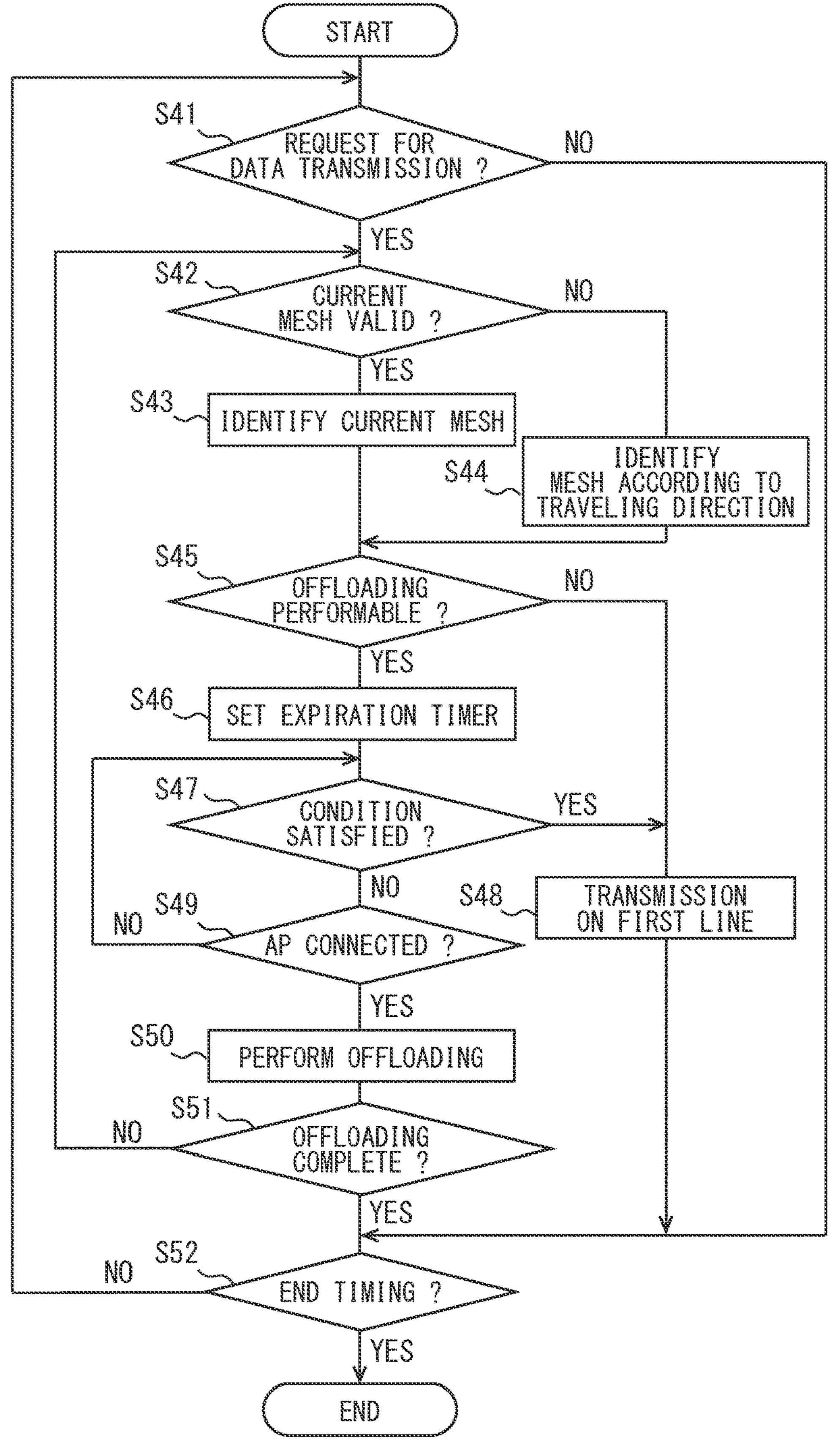
FIG. 14 is a flowchart showing an example of the flow of an offload related process in the control unit.

Next, an example of the flow of processing related to data offloading (hereinafter referred to as offloading related processing) in the control unit 400 is described using a flowchart of FIG. 14. The flowchart of FIG. 14 may be configured to start when the power switch is turned on and mesh information is held in the mesh information holder 404 in the mesh information acquisition related processing.

First, in step S41, if there is a data transmission request from the end ECU (YES in S41), the process proceeds to step S42. When data scheduled to be transmitted is managed by the managing unit 401, it is sufficient that there is a data transmission request from the end ECU. On the other hand, when there is no data transmission request from the end ECU (NO in S41), the process proceeds to step S52.

In step S42, if there is a valid area-specific wait time for the current mesh (YES in S42), the process proceeds to step S43. On the other hand, if there is no valid area-specific wait time for the current mesh (NO in S42), the process proceeds to step S44.

In step S43, the wait time estimator 405 identifies the area-specific wait time of the current mesh as the second line wait time, and identifies it as the offloading wait time. Then, the process proceeds to step S45. On the other hand, in step S44, the wait time estimator 405 identifies the second line wait time according to the traveling direction of the own vehicle, and identifies it as the offloading wait time. Then, the process proceeds to step S45.

In step S45, the offloading determiner 408 determines whether offloading is performable based on the offloading wait time. If it is determined that offloading is performable (YES in S45), the process proceeds to step S46. On the other hand, if it is determined that an offloading is impossible (NO in S45), the process proceeds to step S48.

In step S46, the transmission determiner 409 sets an expiration timer, and proceeds to step S47. In step S47, when the count value of the expiration timer satisfies the expiration condition (YES in S47), the process proceeds to step S48. On the other hand, when the count value of the expiration timer does not satisfy the expiration condition (NO in S47), the process proceeds to step S49. In step S48, the transmission determiner 409 causes the data to be transmitted on the first line, and the process proceeds to step S52.

In step S49, when the WF communication unit 420 has been successfully connected to an AP (YES in S49), the process proceeds to step S50. On the other hand, when the WF communication unit 420 cannot connect to any AP (NO in S49), the process returns to S47 and repeats the processing. In step S50, the transmission determiner 409 causes the data to be transmitted on the second line, and the process proceeds to step S51. That is, an offloading is performed.

In step S51, if an offloading has been complete (YES in S51), the process proceeds to step S52. On the other hand, if an offloading has not been complete (NO in S51), the process returns to S42 to repeat the processing. Accordingly, when the offloading wait time is corrected by using the stop time, the process is repeated using the corrected offloading wait time. It should be noted that if the offloading has not yet been complete, the offloading wait time may be corrected based on the stop time, and the process may be returned to S45 to repeat the processing.

In step S52, if it is a timing to end the offloading related processing (YES in S52), the offloading related processing ends. The offloading related processing ends when the power switch is turned off, for example. On the other hand, if it is not a timing to end the offloading related processing (NO in S52), the process returns to S41, and repeats the processing.

<Summary of the First Embodiment>

According to the configuration of the first embodiment, the CS 2 transmits, to the target vehicle HV, the estimation information that enables estimation of the offloading wait time, which is the wait time until the target vehicle HV can perform/start an offloading. The estimation information is the area-specific wait time according to the encounter probability of the target vehicle HV encountering the AP, which is determined based on the AP distribution for each area, it is not necessary to preset a travel route of the target vehicle HV, and it is not necessary to limit the travel route thereof. Further, on the target vehicle HV, the offloading wait time is estimated using the area-specific wait time. Then, since it is possible to determine whether offloading is performable based on the estimated offloading wait time, data that needs to be transmitted is easily transmittable by offloading at an offloading performable timing. As a result, it is possible to improve the offloading rate regarding the transmission of data in the vehicle without limiting the vehicle's travel route or without presetting the vehicle's travel route.

Second Embodiment

Although the weighting unit 216 is configured, in the first embodiment, to perform weighting of the AP map information stored in the AP map DB 215, it is not necessary to have the configuration limited thereto. A configuration may be adopted in which the weighting unit 216 is not provided in the CS 2 and the weighting described above is not performed.

Third Embodiment

In the first embodiment, a configuration is shown in which the offloading wait time is identified according to the encounter probability of encountering an AP based on the AP distribution, but such configuration is not necessarily the only one. For example, a configuration (hereinafter referred to as Third Embodiment) may be adopted in which the offloading wait time is identified according to a reach probability of reaching an AP based on hop record (i.e., via record) of the plurality of vehicles passing through the AP(s). The following describes an example of the third embodiment with reference to the accompanying drawings.

<Schematic Configuration of Vehicle Communication System 1*a*>

Figure 15:
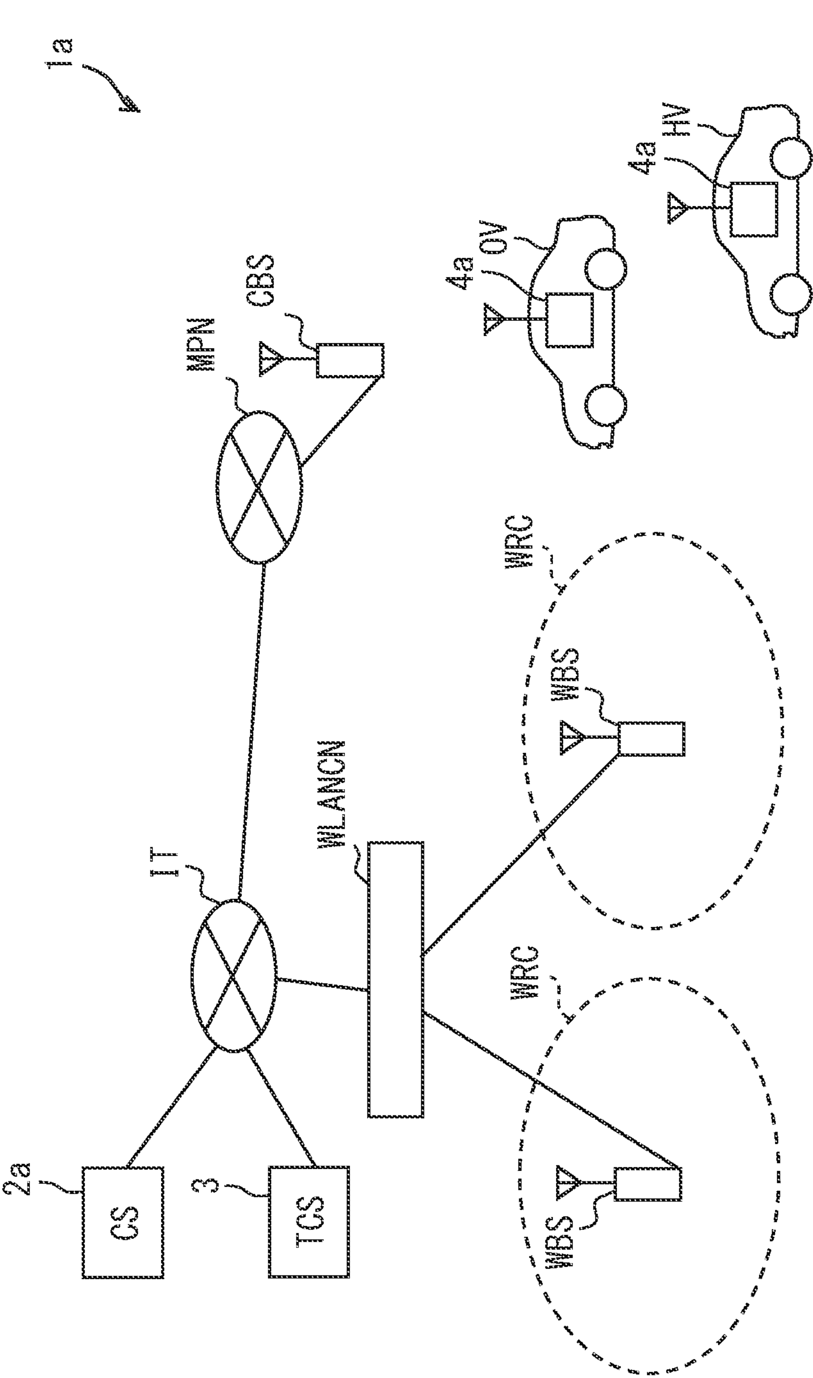
FIG. 15 is a diagram showing an example of a schematic configuration of a vehicle communication system.

Hereinafter, a present embodiment is described with reference to the drawings. First, a vehicle communication system 1*a* is explained by using FIG. 15. As shown in FIG. 15, the vehicle communication system 1*a* includes a CS 2*a*, the TCS 3, and a vehicle unit 4*a*. The vehicle communication system 1*a* is the same as the vehicle communication system 1 of the first embodiment except that it includes a CS 2*a* and a vehicle unit 4*a* instead of the CS 2 and the vehicle unit 4.

<Schematic Configuration of CS 2*a*>

The CS 2*a* includes, for example, a processor, a memory, an I/O, and a bus connecting them, and executes various processes related to responses to requests from the vehicle unit 4*a* by executing control programs stored in the memory. The memory mentioned here is a non-transitory, tangible storage medium, and stores programs and data that can be read by a computer. The non-transitory, tangible storage medium is implemented by a semiconductor memory or the like.

Figure 16:
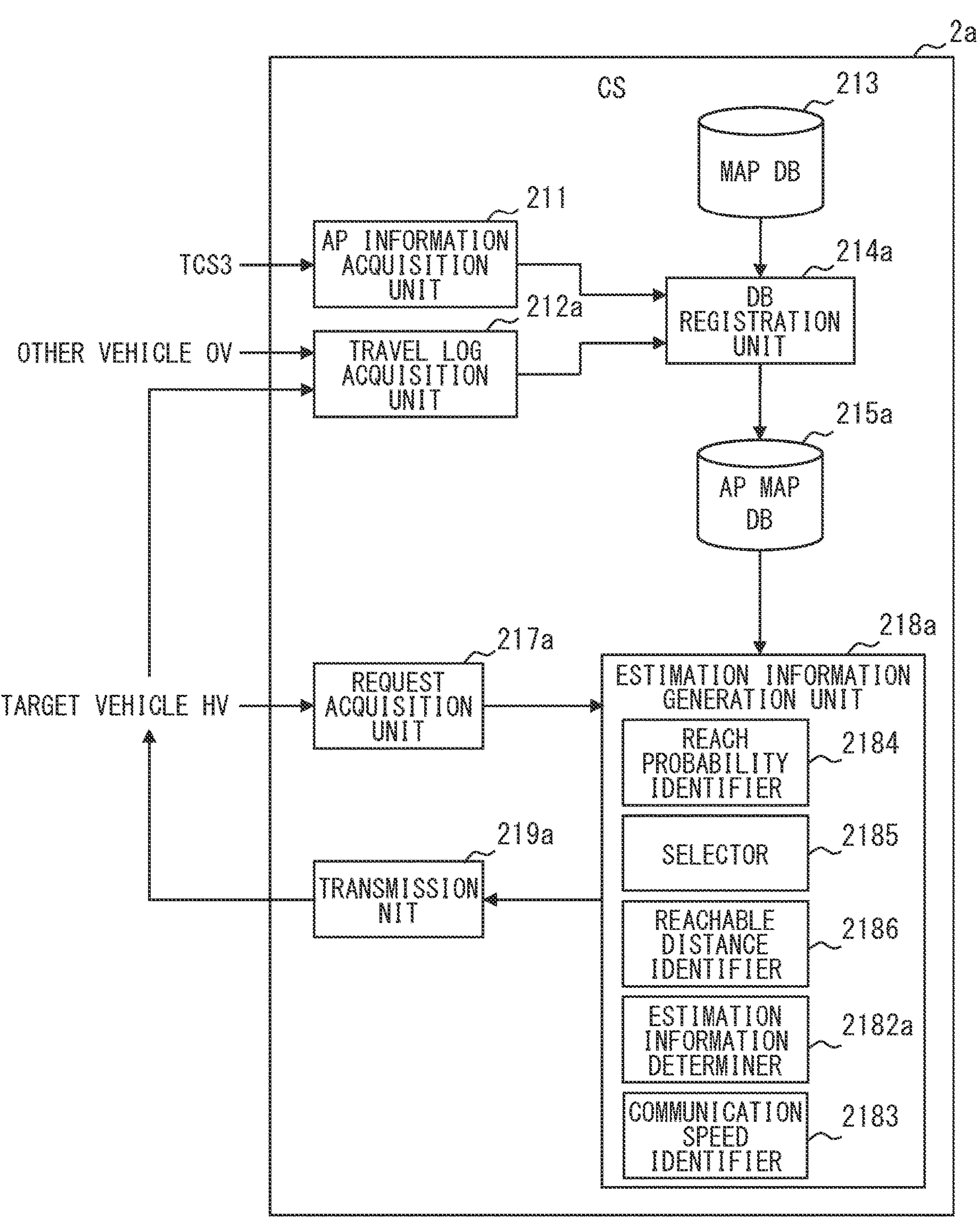
FIG. 16 is a diagram showing an example of a schematic configuration of a center server CS.

Next, a schematic configuration of the CS 2*a* is described with reference to FIG. 16. As shown in FIG. 16, the CS 2*a* includes the AP information acquisition unit 211, a travel log acquisition unit 212*a*, the map DB 213, a DB registration unit 214*a*, an AP map DB 215*a*, a request acquisition unit 217*a*, an estimation information generation unit 218*a*, and a transmission unit 219*a*, respectively as a functional block. The AP information acquisition unit 211 and the map DB 213 are the same as in the first embodiment. Part or all of the functions performed by the CS 2*a* may be configured as hardware using one or a plurality of ICs or the like. Also, part or all of the functional blocks provided by the CS 2 may be implemented as a combination of software executed by a processor and hardware members. This CS 2*a* also corresponds to a server. Performing the processing of each functional block of the CS 2*a* by the computer corresponds to performing the communication management method.

The travel log acquisition unit 212*a* is the same as the travel log acquisition unit 212 of the first embodiment, except that some elements of the travel log to be acquired are different. Specifically, it is the same as the travel log acquisition unit 212 of the first embodiment, except that a terminal identification ID is included in the second line communication information in the travel log. The terminal identification ID may be an ID corresponding to the type of terminal used for connection with the AP. The term "type of terminal" in the context herein means, for example, different type of chip used therein.

The DB registration unit 214*a* registers the AP map information to the AP map DB 215*a* based on the AP information acquired by the AP information acquisition unit 211, the travel log acquired by the travel log acquisition unit 212*a*, and the map data stored in the map DB 213. The DB registration unit 214*a* is the same as the DB registration unit 214 of the first embodiment, except that part of the AP map information to be registered is different. The AP map DB 215*a* is the same as the AP map DB 215 of the first embodiment, except that part of the stored AP map information is different.

Here, points of the AP map information that are different from the first embodiment are described. The first difference is that the availability flag is registered for each terminal identification ID described above. Why the terminal identification ID is included in the travel log is, because chip performance differs depending on the type of terminal, and ease of connection with the AP may vary accordingly.

Figures 17, 18:
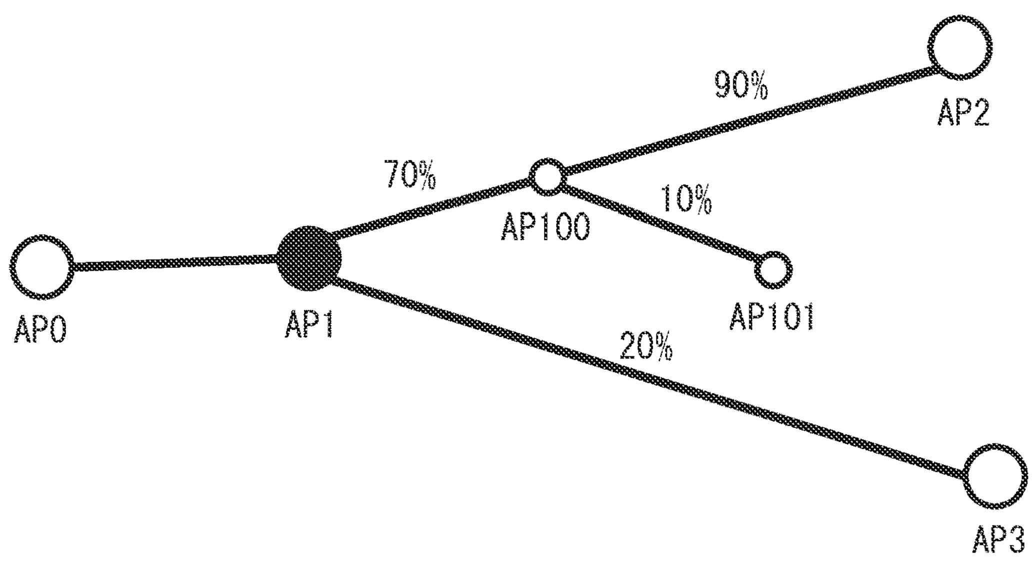
FIG. 17 is a diagram for explaining an example of connected AP information.
FIG. 18 is a diagram showing an image of connection relationships between APs represented by the connected AP information.

The second point of difference is that connected AP information is included therein, i.e., in the travel log. The connected AP information is information on a connection relationship to nearby APs regarding each of the APs. The nearby AP may be, for example, an AP within a radius of several tens of meters in position coordinates. The connected AP information is registered based on the records of the connected AP(s) subsequent to a connection to a target AP (hereinafter referred to as hop record(s)) regarding each of the plurality of vehicles. As the connected AP information, as shown in FIG. 17, the AP_ID and the reach probability are associated and registered, for each AP that has a record of connection to the target AP. In the example in FIG. 17, the connected AP information about an AP whose AP_ID is "00001" is shown. In the example of FIG. 17, an AP with AP_ID of "00000" is registered in association with a reach probability of "90%." An AP with AP_ID of "00002" is registered in association with a reach probability of "70%." A reach probability of "20%" is associated with an AP with AP_ID of "00003" and registered. The reach probability assigned to an AP becomes higher when the number of recorded connections to the AP subsequent to the connection to the target AP increases. The reach probability is updated everytime a new travel log is acquired and the number of recorded connections increases. Note that the reach probability may be a value of a ratio for each AP, using as a denominator the number of recorded connections of all APs that have been connected subsequent to the target AP. In such case, the sum of the reach probabilities of all the APs that have a recorded connection subsequent to the connection to the target AP is assumed as 100%.

When a request for the estimation information is transmitted from the communication module 40*a* of the vehicle unit 4*a*, the request acquisition unit 217*a* acquires such a request. The request for the estimation information may be configured to be transmitted via the second line, for example. The request for the estimation information includes time information, vehicle position, SSID of the AP being detected, BSSID of the AP being detected, and AP detection past history for the target vehicle HV using the requesting vehicle unit 4*a*. You can do it. The time information may be the current date and time. The vehicle position may be the latitude, longitude, and altitude identified by the locator 41. The AP detection past history may be identification information of APs detected at several locations in the most recent past. The identification information may be AP_ID or BSSID. AP detection may also be referred to as AP connection. Further, the estimation information may be configured not to include the AP detection past history. A request for the estimation information may be rephrased as an inquiry about an AP to which the requesting target vehicle HV highly likely establishes a connection subsequent to the current connection to a certain AP.

The estimation information generation unit 218*a* generates response information as the estimation information when a request for the estimation information is acquired by the request acquisition unit 217*a*. Based on the request for the estimation information, the estimation information generation unit 218*a* selects an AP with a high possibility that the requesting target vehicle HV will connect next. Then, a reachable distance to such an AP is identified.

The estimation information generation unit 218*a* has a reach probability identifier 2184 (i.e., reach probability identifying unit), a selector 2185 (i.e., selecting unit), a reachable distance identifier 2186 (i.e., reachable distance identifying unit), an estimation information determiner 2182*a* (i.e., estimation information determining unit), and the communication speed identifier 2183 respectively as sub-functional blocks. The estimation information generation unit 218*a* identifies an AP to which the target vehicle HV is currently connected (hereinafter referred to as a currently-connected AP) based on the information included in the request for the estimation information. For example, from the SSID and the latitude and longitude of the vehicle position, a closest AP to the target vehicle HV may be identified as the currently-connected AP.

The reach probability identifier 2184 identifies the reach probability from the currently-connected AP to the target AP based on the connected AP information registered in the AP map DB 215*a*. In other words, the reach-probability identifying unit 2184 identifies the reach probability between APs, derived from the hop records regarding the travels of the plurality of vehicles passing through APs. For example, for an AP which is named as an AP1, if the reach probability of reaching an AP named as an AP2 is defined as 70% in the connected AP information, the probability of reaching AP2 from AP1 is identified as 70%.

The selector 2185 selects an AP having the highest encounter probability with the target vehicle HV based on the information on the reach probability identified by the reach probability identifier 2184. Such a selector 2185 corresponds to a server-side selector. For example, such a selection may be performed in the following manner. Here, description is made with reference to FIG. 18. FIG. 18 shows a diagram of a connection relationship between APs represented by the connected AP information. In the example of FIG. 18, the AP to which the target vehicle HV is currently connected is AP1. AP0 is an AP to which the target vehicle HV has been connected in the most recent past. It is assumed that AP0, AP100, and AP3 have a record of being connected subsequent to AP1. It is assumed that AP2 and AP101 have a record of being connected subsequent to AP100. AP0, AP2, and AP3 are assumed as APs with high offloading efficiency for the target vehicle HV. AP100 and AP101 are assumed as APs with low offloading efficiency for the target vehicle HV.

The selector 2185 excludes APs included in the AP detection past history from the selection candidates based on the AP detection past history included in the request for the estimation information. In the example of FIG. 18, among AP0, AP3, and AP100 which are selection candidates for AP1, AP0 is excluded from the selection candidates. The selector 2185 identifies an AP with the highest reach probability subsequent to the currently-connected AP from among the selection candidates based on the connected AP information about the currently-connected AP. In the example of FIG. 18, AP100 is identified. Subsequently, the selector 2185 determines whether or not the identified AP can be used for offloading based on the availability flag for the identified AP. If the availability flag has a value indicating availability, it may be determined that the identified AP can be used for offloading. On the other hand, if the availability flag is a value indicating non-availability, it may be determined that the identified AP is not available for offloading. In the example of FIG. 18, AP 100 has low offloading efficiency and is determined to be unusable for offloading.

If it is determined that the AP cannot be used for offloading, the processing is repeated until an AP that can be used for offloading is found. In the example of FIGS. 18, AP2 and AP3 are available for offloading, and AP2 is selected because it has a higher reach probability than AP3. The reach probability of AP2 is 70%×90%=63%. If an AP that can be used for offloading and has a reach probability equal to or greater than a threshold value is not found, the processing ends as no AP selection (no AP selectable). The threshold mentioned here may be set arbitrarily.

Here, the selector 2185 narrows down APs that are estimated to be available for offloading, and selects an AP with the highest encounter probability of encountering the target vehicle HV, but such a configuration is not a limiting one. For example, regardless of whether or not it is estimated to be available for offloading use, an AP with the highest encounter probability of encountering the target vehicle HV may be selected. Note that a configuration that narrows down to APs that are estimated to be available for offloading has a higher possibility of improving the offloading efficiency.

The reachable distance identifier 2186 identifies a distance (hereinafter referred to as reachable distance) from the target vehicle HV to the AP selected by the selecting unit 2185 (hereinafter referred to as a selected AP). The reachable distance identifier 2186 corresponds to a server-side reachable distance identifier. The reachable distance may be a linear distance between the position coordinates of the currently-connected AP and the position coordinates of the selected AP. Alternatively, by using map data, a link distance of the shortest travel route from the position coordinates of the currently-connected AP to the position coordinates of the selected AP may be identified as the reachable distance. The estimation information determiner **2182*a* determines the reachable distance identified by the reachable distance identifier 2186** as the estimation information according to the encounter probability of encountering the target vehicle HV.

The communication speed identifier 2183 identifies a representative value of the first line communication speed. The communication speed identifier 2183 may identify the representative value at a position close to the selected AP. The position near the selected AP may be, for example, an inside of a mesh where the selected AP is located.

The estimation information generation unit **218*a* generates data, including (a) the reachable distance determined by the estimation information determiner 2182*a* and (b) the representative value of the first line communication speed identified by the communication speed identifier 2183, as the response information. The response information may also include (a) AP reachability and (b) AP identification information at the time of inquiry. AP reachability is a flag indicating whether or not a selected AP is actually determined as a certain AP. When the selector 2185 ends the processing as no AP selection, a flag indicating that the AP cannot be reached is used. The AP identification information at the time of inquiry is assumed as the identification information of the currently-connected AP. The identification information may be AP_ID or BSSID. Such identification information may be used for updating the AP detection past history in the vehicle unit 4*a***.

The transmission unit **219*a* transmits the response information generated by the estimation information generation unit 218*a* to the vehicle unit 4*a* of the target vehicle HV that has transmitted the request for the estimation information. That is, the transmission unit 219*a* transmits the estimation information determined by the estimation information determiner 2182*a* to the target vehicle HV. The processing in the transmission unit 219*a* also corresponds to a transmission step. The transmission unit 219*a* may cause the response information to be transmitted on the second line via the currently-connected AP to which the target vehicle HV is connected. Note that the transmission unit 219*a*** may cause the response information to be transmitted on the first line.

<Response Information Transmission Related Processing in CS **2*a***>

Figure 19:
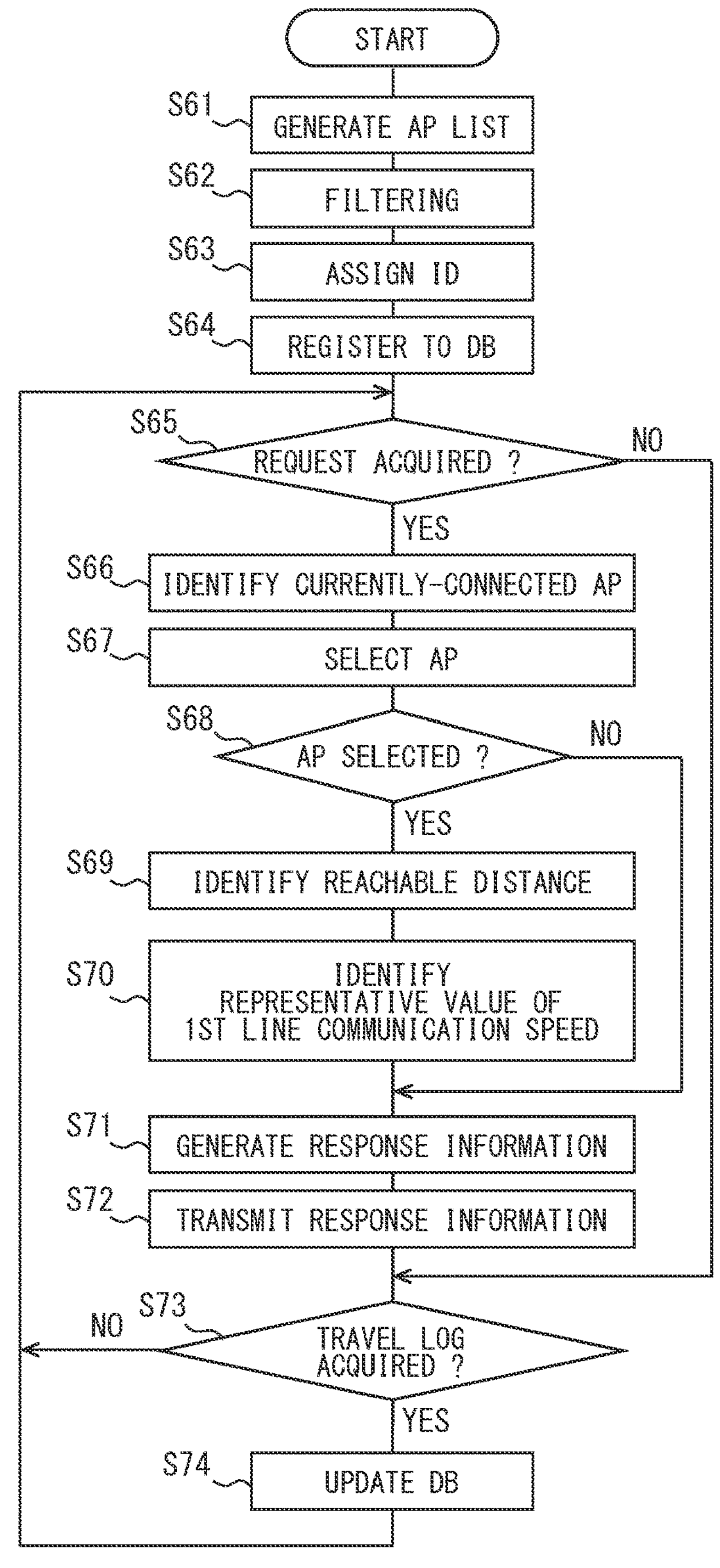
FIG. 19 is a flowchart showing an example of a flow of a response information transmission related process in the center server CS.

Here, an example of the flow of processing related to transmission of response information in the CS **2*a* (hereinafter referred to as response information transmission related processing) is described using a flowchart of FIG. 19**.

First, in step S61, the DB registration unit **214*a* generates an AP list in the same manner as in S1. In step S62, the DB registration unit 214*a* generates a DB in the same manner as in S2. In step S63, the DB registration unit 214*a* assigns an ID as the AP map information stored in the AP map DB 215*a* in the same manner as in S3**.

In step S64, the DB registration unit **214*a* uses the travel log acquired by the travel log acquisition unit 212*a* to store the values of the elements of the AP map information that have not yet been stored in the AP map DB 215*a***. For example, "BSSID," "radio type," "channel," "RSSI," "throughput," "passing speed," "passing time," "availability flag," and "connected AP information" are stored. DB registration is performed in such manner.

In step S65, when the request acquisition unit **217*a* acquires a request for the estimation information (YES in S65), the process proceeds to step S66. On the other hand, when the request acquisition unit 217*a* has not acquired a request for the estimation information (NO in S65), the process proceeds to step S73**.

In step S66, the estimation information generation unit **218*a* identifies the currently-connected AP of the target vehicle HV based on the information included in the request for the estimation information. In step S67, the selector 2185 selects an AP with the highest encounter probability with the target vehicle HV based on the information of the reach probability identified by the reach probability identifier 2184**.

In step S68, if an AP has actually been selected by the selector 2185 (YES in S68), the process proceeds to step S69. On the other hand, if the selector 2185 cannot select an AP (NO in S68), it is determined that no AP is selectable, and the process proceeds to step S71. In step S69, the reachable distance identifier 2186 identifies the reachable distance from the target vehicle HV to the AP selected in S67.

In step S70, the communication speed identifier 2183 identifies the representative value of the first line communication speed at a position close to the selected AP selected in S67. The processing of S70 may also be performed when the selector 2185 cannot select an AP. In order to reduce the unnecessary processing load, it is preferable not to perform the processing of S70 when the selector 2185 cannot select an AP.

In step S71, the estimation information generation unit 218*a* generates the response information. If an AP has actually been selected in S67, data including (a) the representative value of the reachable distance identified in S69 and (b) the first line communication speed identified in S70 is generated as the response information. If the AP could not be selected in S67, the reachable distance is not included in the response information. In step S72, the transmission unit 219*a* transmits the response information generated in S71 to the vehicle unit 4*a* of the target vehicle HV that has transmitted the request for the estimation information.

In step S73, when a new travel log is acquired by the travel log acquisition unit 212*a* (YES in S73), the process proceeds to step S74. On the other hand, if the travel log acquisition unit 212*a* has not acquired a new travel log (NO in S73), the process returns to S65, and repeats the process.

In step S74, the DB registration unit 214*a* updates the DB. In the DB update, the DB registration unit 214*a* updates the AP map information stored in the AP map DB 215*a* with the information of the newly-acquired travel log. Then, the process returns to S65 to repeat the processing. By updating the DB, the connected AP information is also updated one by one. It should be noted that the response information transmission related processing may be configured to periodically restart the processing from S61.

<Schematic Configuration of Vehicle Unit 4*a*>

Next, a schematic configuration of the vehicle unit 4*a* is described with reference to FIG. 20. As shown in FIG. 20, the vehicle unit 4*a* includes a communication module 40*a*, the locator 41, the map DB 42, and the vehicle sensor 43. The vehicle unit 4*a* is the same as the vehicle unit 4 of the first embodiment, except that the communication module 40 is replaced with the communication module 40*a*.

<Schematic Configuration of the Communication Module 40*a*>

Next, a schematic configuration of the communication module 40*a* is described with reference to FIG. 20. As shown in FIG. 20, the communication module 40*a* includes a control unit 400*a*, the WF communication unit 420, and the CL communication unit 440. The communication module 40*a* is the same as the communication module 40 of the first embodiment except that it includes the control unit 400*a* instead of the control unit 400. Such a communication module 40*a* also corresponds to a communication device.

<Schematic Configuration of the Control Unit 400*a*>

Next, a schematic configuration of the control unit 400*a* is described with reference to FIG. 20. As shown in FIG. 20, the control unit 400*a* includes the managing unit 401, a requester 402*a* (i.e., requesting unit), an estimation information acquirer 403*a* (i.e., estimation information acquiring unit), a wait time estimator 405*a* (i.e., wait time estimating unit), a communication speed identifier 406*a* (i.e., communication speed identifying unit), the stop time measurer 407 (i.e., stop time measuring unit), the offloading determiner 408 (i.e., offloading determining unit), and the transmission determiner 409 (i.e., transmission determining unit), as functional blocks. The managing unit 401, the stop time measurer 407, the offloading determiner 408, and the transmission determiner 409 are the same as those in the first embodiment. Part or all of the functions performed by the control unit 400*a* may be configured as hardware using one or a plurality of ICs or the like. Also, part or all of the functional blocks provided in the control unit 400*a* may be implemented by a combination of software executed by a processor and hardware members. Such a control unit 400*a* also corresponds to a vehicle device. Execution of the processing of each functional block of the control unit 400*a* by the computer also corresponds to performing the communication management method.

The data to be transmitted by the communication module 40*a* may include the aforementioned travel log. For the terminal identification ID in the travel log, an ID corresponding to the type of the communication module 40*a* may be used. The transmission frequency of the travel log may be, for example, once a day.

The requester 402*a* transmits a request for the estimation information to the CS 2*a*. Such a request may be transmitted from the CL communication unit 440 to the CS 2*a* on the first line. For example, when the WF communication unit 420 connects to the AP, the requester 402*a* may transmit a request for the estimation information. Note that the WF communication unit 420 preferably connects only to APs registered in a safe connection destination list. Such a list may be stored in advance in the non-volatile memory of the control unit 400*a*. The requester 402*a* may cause the request for the estimation information to be transmitted on the second line via the connected AP. Note that the request for the estimation information may also be transmitted on the first line.

The request for the estimation information may include time information, a vehicle position, SSID of the AP being detected, BSSID of the AP being detected, and AP detection past history for the target vehicle HV that is the own vehicle. The SSID and BSSID of the AP being detected may be acquired from the WF communication unit 420. It is assumed that the AP detection past history is stored in the nonvolatile memory of the control unit 400*a*.

The estimation information acquirer 403*a* acquires the response information transmitted from the CS 2*a* in response to the request for the estimation information. In other words, the estimation information acquirer 403*a* acquires, as the estimation information according to the encounter probability, the reachable distance from the target vehicle HV to an AP, which has the highest reach probability of the target vehicle HV estimated by using the reach probability between APs that are identified by the hop records regarding the travels of the plurality of vehicles passing through APs. The processing in the estimation information acquirer 403*a* also corresponds to an estimation information acquisition step.

The wait time estimator 405*a* estimates the offloading wait time based on the reachable distance to the selected AP included in the response information acquired by the estimation information acquirer 403*a*. In other words, the offloading wait time is estimated based on the reachable distance acquired by the estimation information acquirer 403*a*. The wait time estimator 405*a* may be configured to estimate the offloading wait time when a data transmission request is received from the end ECU. The processing in the wait time estimator 405*a* also corresponds to a wait time estimation step.

For example, the offloading wait time can be estimated as follows. First, the wait time estimator 405*a* identifies the second line wait time estimated to be required for using the second line. The wait time estimator 405*a* may identify a value acquired by dividing the reachable distance to the selected AP by a reference speed of the target vehicle HV as the second line wait time. The reference speed of the target vehicle HV may be, for example, an average vehicle speed detected by the vehicle sensor over a certain period of time in the past.

Subsequently, the wait time estimator 405*a* estimates the offloading wait time using the identified second line wait time in the same manner as described in the first embodiment. It may be preferable that the wait time estimator 405*a* corrects and estimates the offloading wait time as a shorter time, as the first line communication speed identified by the communication speed identifier 406 lowers, in the same manner as described in the first embodiment. The communication speed identifier 406*a* may identify the first line communication speed from the representative value of the first line communication speed included in the response information acquired by the estimation information acquirer 403*a*. In other words, the representative value of the first line communication speed at a position close to the selected AP may be identified as the first line communication speed. Further, in the same manner as described in the first embodiment, it may be preferable that the wait time estimator 405*a* identifies the offloading wait time by correcting it to be a longer time, as the vehicle stop time measured by the stop time measurer 407 increases. As described above, the processing by the offloading determiner 408 and the transmission determiner 409 may be performed in the same manner as in the first embodiment.

<Offloading Related Processing in the Control Unit 400*a*>

Figure 21:
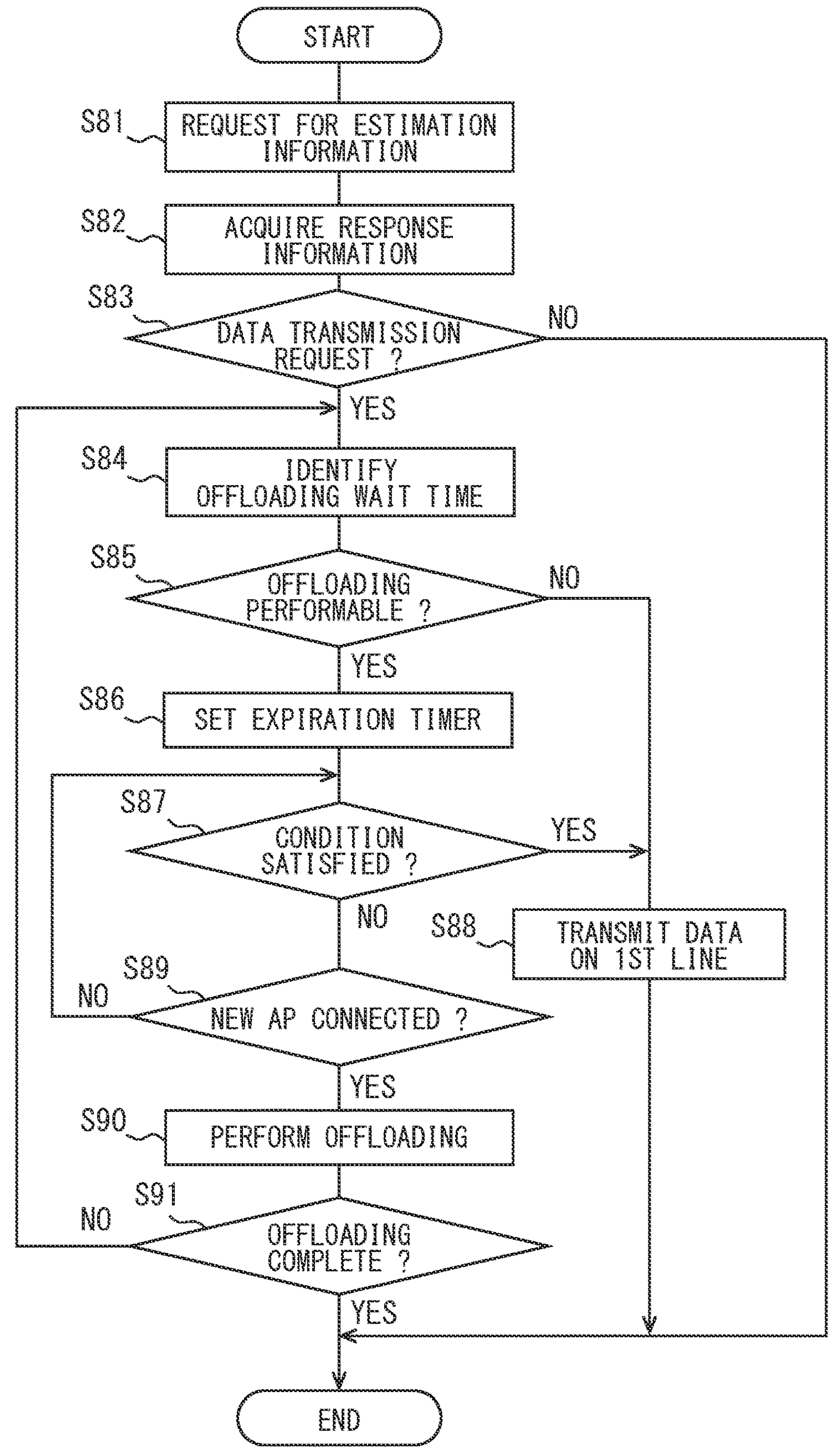
FIG. 21 is a flowchart showing an example of a flow of the offload related process in the control unit.

Next, an example of the flow of processing related to data offloading (hereinafter referred to as offloading related processing) in the control unit 400*a* is described by using a flowchart of FIG. 21. The flowchart in FIG. 21 may be configured to start everytime the WF communication unit 420 newly connects to an AP.

First, in step S81, the requester 402*a* transmits a request for the estimation information to the CS 2*a*. In step S82, the estimation information acquirer 403*a* acquires the response information transmitted from the CS 2*a*.

In step S83, if there is a data transmission request from the end ECU (YES in S83), the process proceeds to step S84. When data scheduled to be transmitted is managed by the managing unit 401, it is sufficient that there is a data transmission request from the end ECU. The data transmission request from the end ECU may mean that there is a data transmission request for data which cannot be complete during connection with the currently-connected AP. On the other hand, if there is no data transmission request from the end ECU (NO in S83), the offloading related processing ends.

In step S84, the wait time estimator 405*a* estimates the offloading wait time based on the reachable distance to the selected AP included in the response information acquired in step S82. In step S85, the offloading determiner 408 determines whether offloading is performable based on the offloading wait time. If it is determined that offloading is performable (YES in S85), the process proceeds to step S86. On the other hand, if it is determined that an offloading is impossible (NO in S85), the process proceeds to step S88.

In step S86, the transmission determiner 409 sets an expiration timer, and the process proceeds to step S87. In step S87, when the count value of the expiration timer satisfies the expiration condition (YES in S87), the process proceeds to step S88. On the other hand, if the count value of the expiration timer does not satisfy the expiration condition (NO in S87), the process proceeds to step S89. In step S88, the transmission determiner 409 causes the data to be transmitted on the first line, and ends the offloading related processing.

In step S89, if the WF communication unit 420 is connected to an AP including a new AP (YES in S89), the process proceeds to step S90. On the other hand, if the WF communication unit 420 cannot connect to any new AP (NO in S89), the process returns to S87 and repeats the processing. In step S90, the transmission determiner 409 causes the data to be transmitted on the second line. That is, an offloading is performed.

In step S91, if the offloading has been complete (YES in S91), the offloading related processing ends. On the other hand, if the offloading has not been complete (NO in S91), the process returns to S84 to repeat the process. Accordingly, when the offloading wait time is corrected by using the stop time, the process is repeated using the corrected offloading wait time.

<Overview of the Third Embodiment>

According to the configuration of the third embodiment, the CS 2*a* transmits, to the target vehicle HV, the estimation information that enables estimation of the offloading wait time, which is the wait time for the target vehicle HV before performing an offloading. The estimation information is the reachable distance from the target vehicle HV to the AP with the highest reach probability, which is the reach probability between APs that are identified by the hop records regarding the travels of the plurality of vehicles passing through APs. Therefore, there is no need to preset or limit the travel route of the target vehicle HV. Also, in the target vehicle HV, the offloading wait time is estimated based on such a reachable distance. Then, since it is possible to determine whether offloading is performable based on the estimated offloading wait time, data that needs to be transmitted is easily transmittable by offloading at an offloading performable timing. As a result, it is possible to improve the offloading rate regarding the transmission of data in the vehicle without limiting the vehicle's travel route or without presetting the vehicle's travel route.

Fourth Embodiment

In the third embodiment, the server identifies the reachable distance from the target vehicle HV to the selected AP, but the configuration is not necessarily limited to the above. For example, a configuration (hereinafter referred to as the Fourth Embodiment) may be adopted in which the reachable distance is identified in the target vehicle HV. Hereinafter, an example of the fourth embodiment is described with reference to the drawings.

<Schematic Configuration of Vehicle Communication System 1*b*>

Figure 22:
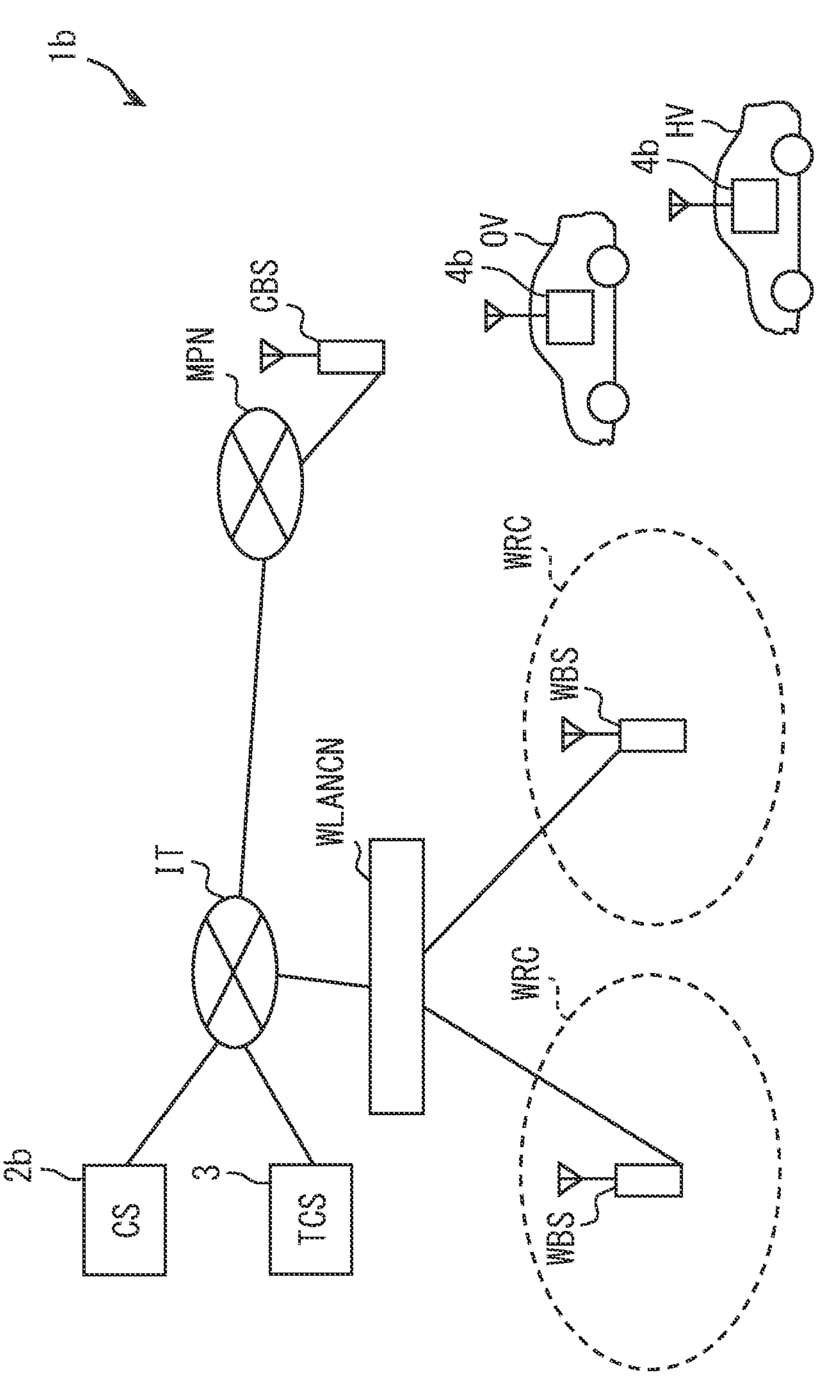
FIG. 22 is a diagram showing an example of a schematic configuration of a vehicle communication system.

Hereinafter, a present embodiment is described with reference to the drawings. First, a vehicle communication system 1*b* is explained by using FIG. 22. As shown in FIG. 22, the vehicle communication system 1*b* includes a CS 2*b*, the TCS 3, and a vehicle unit 4*b*. The vehicle communication system 1*b* is the same as the vehicle communication system 1*a* of the second embodiment except that it includes a CS 2*b* and a vehicle unit 4*b* instead of the CS 2*a* and the vehicle unit 4*a*.

<Schematic configuration of CS 2*b*>

The CS 2*b* includes, for example, a processor, a memory, an I/O, and a bus connecting them, and executes various processes related to responses to requests from the vehicle unit 4*b* by executing control programs stored in the memory. The memory mentioned here is a non-transitory, tangible storage medium, and stores programs and data that can be read by a computer. The non-transitory, tangible storage medium is implemented by a semiconductor memory or the like.

Figure 23:
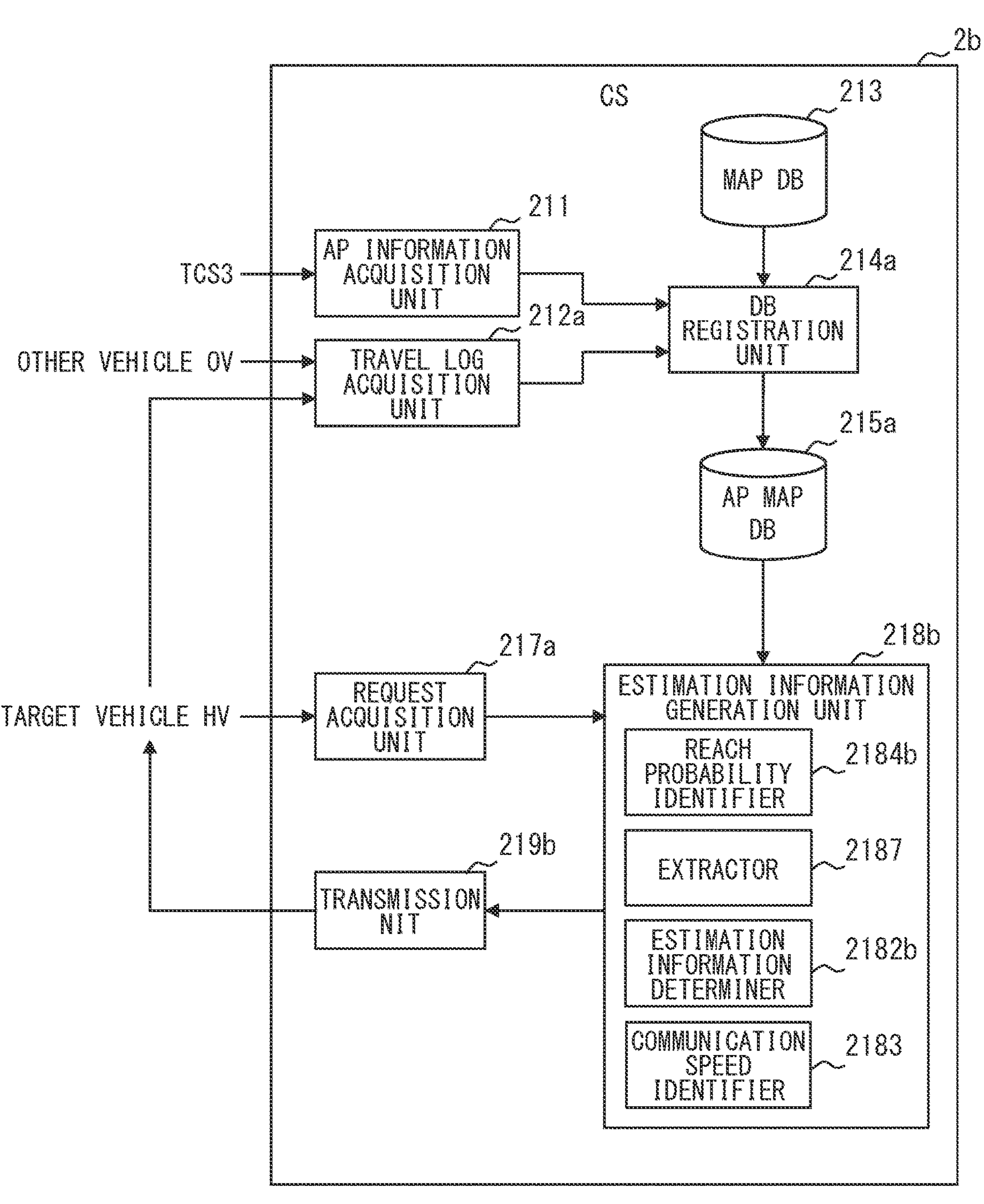
FIG. 23 is a diagram showing an example of a schematic configuration of a center server CS.

Next, a schematic configuration of the CS 2*b* is described with reference to FIG. 23. As shown in FIG. 23, the CS 2*b* includes the AP information acquisition unit 211, a travel log acquisition unit 212*a*, the map DB 213, a DB registration unit 214*a*, an AP map DB 215*a*, a request acquisition unit 217*a*, an estimation information generation unit 218*b*, and a transmission unit 219*b*, respectively provided as a functional block. The CS 2*b* is the same as the CS 2*a* of the second embodiment, except that it includes an estimation information generation unit 218*b* and a transmission unit 219*b* instead of the estimation information generation unit 218*a* and the transmission unit 219*a*. Such a CS 2*b* also corresponds to a server. Execution of the processing of each functional block of CS 2*b* by the computer corresponds to execution of the communication management method.

The estimation information generation unit 218*b* generates the response information as the estimation information when the request acquisition unit 217*a* acquires a request for the estimation information. Based on the request for the estimation information, the estimation information generation unit 218*b* extracts APs near the currently-connected AP to which the requesting target vehicle HV may possibly be connected. Then, the reachable distance is identified from the connected AP information of those APs.

The estimation information generation unit 218*b* has an extractor 2187 (i.e., extraction unit), a reach probability identifier 2184*b* (i.e., reach probability identifying unit), an estimation information determiner 2182*b* (i.e., estimation information determining unit), and the communication speed identifier 2183 (i.e., communication speed identifying unit), as sub-functional blocks. The estimation information generation unit 218*b* identifies the currently-connected AP in the same manner as the estimation information generation unit 218*a*.

The extractor 2187 extracts APs near the currently-connected AP (hereinafter referred to as near APs) based on the AP map information registered in the AP map DB 215*a*. For example, APs within a predetermined distance from the currently-connected AP may be extracted as near APs. The predetermined distance mentioned here may be set arbitrarily. The extractor 2187 preferably excludes APs included in the AP detection past history from the near AP candidates based on the AP detection past history included in the request for the estimation information. Further, based on the availability flag, the extractor 2187 determines whether or not the near AP candidate is an AP that can be used for offloading. Then, it is preferable to exclude APs whose availability flag indicates that they are not available from the near AP candidates. In such manner, possibility of offloading efficiency improvement is raised.

The reach probability identifier 2184*b* identifies the reach probability from the currently-connected AP for each of the near APs extracted by the extractor 2187, based on the connected AP information registered in the AP map DB 215*a*. In other words, the reach probability identifier 2184*b* identifies the reach probability between APs from the hop records regarding the travels of the plurality of vehicles passing through APs. In the example of FIG. 18, the reach probability to reach AP2 may be calculable and identifiable, based on the connected AP information of AP1 and the connected AP information of AP100 and assuming that the currently-connected AP is AP1, as a probability of 70%×90%=63%.

The communication speed identifier 2183 identifies a representative value of the first line communication speed. The communication speed identifier 2183 may identify the representative value at a position close to the near AP. The position close to the near AP may be, for example, an inside of a mesh where the near AP is located.

The estimation information generation unit 218*b* generates, as the response information, the data including (a) the reach probability for each of the near APs identified by the reach probability identifier 2184*b* and (b) the representative value of the first line communication speed identified by the communication speed identifier 2183. The response information may also include the AP identification information at the time of inquiry, similar to that described in the third embodiment.

The transmission unit 219*b* transmits the response information generated by the estimation information generation unit 218*b* to the vehicle unit 4*b* of the target vehicle HV that has transmitted the request for the estimation information. That is, the transmission unit 219*b* transmits, to the target vehicle HV, the reach probability for each of the near APs identified by the reach probability identifier 2184*b*. The processing in the transmission unit 219*b* also corresponds to a transmission step. The transmission unit 219*b* may cause the response information to be transmitted on the second line via the AP to which the target vehicle HV is connected. Note that the transmission unit 219*b* may cause the response information to be transmitted on the first line.

<Response Information Transmission Related Processing in CS 2*b*>

Figure 24:
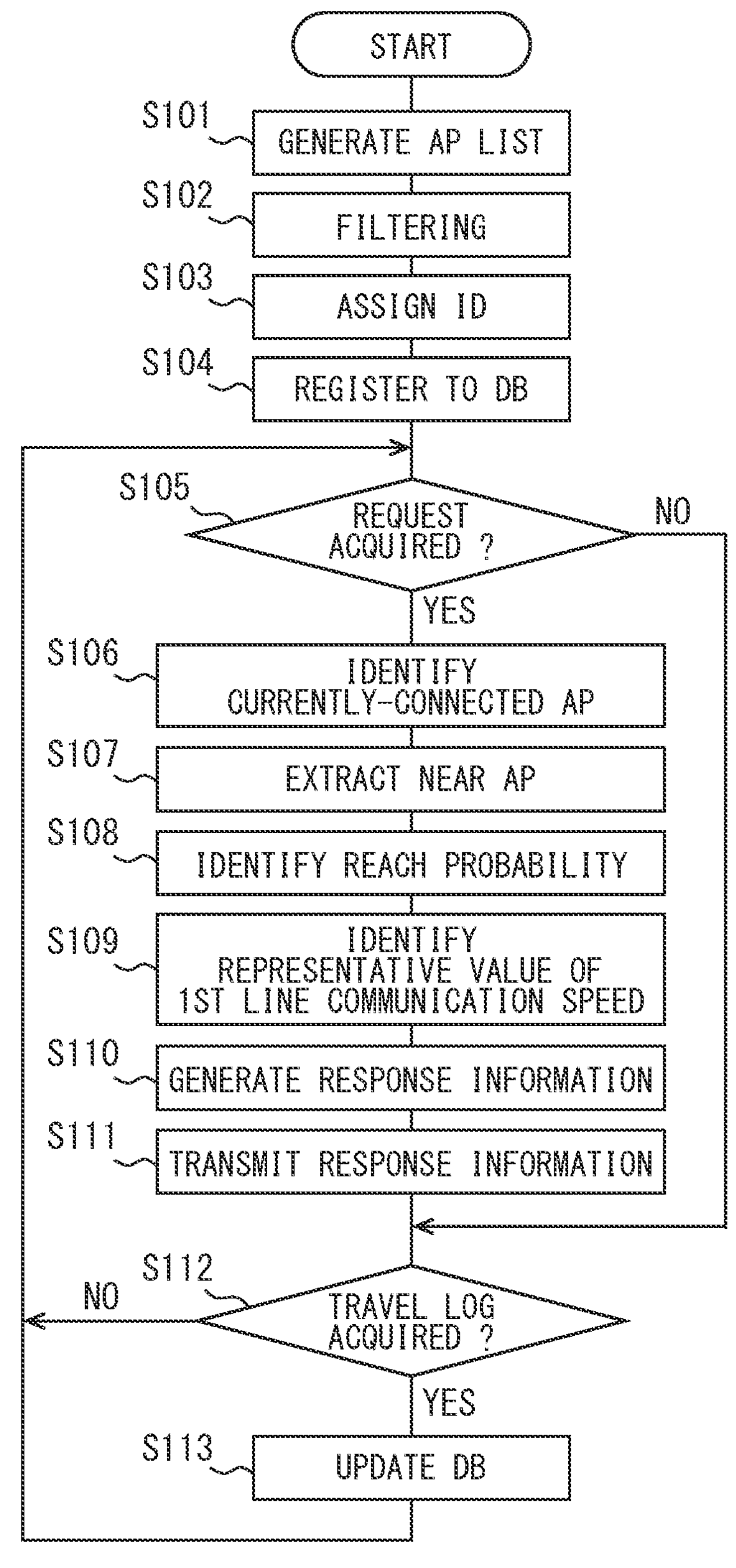
FIG. 24 is a flowchart showing an example of a flow of the response information transmission related process in the center server CS.

Here, an example of the flow of response information transmission related processing in CS 2*b* is described using a flowchart of FIG. 24.

First, the processing from steps S101 to S104 is the same as the processing from S61 to S64. In step S105, when the request acquisition unit 217*b* acquires a request for the estimation information (YES in S105), the process proceeds to step S106. On the other hand, if the request acquisition unit 217*b* has not acquired the request for the estimation information (NO in S105), the process proceeds to step S112.

In step S106, the estimation information generation unit 218*b* identifies the currently-connected AP of the target vehicle HV based on the information included in the request for the estimation information. In step S107, the extractor 2187 extracts near APs of the currently-connected AP based on the AP map information registered in the AP map DB 215*a*.

In step S108, the reach probability identifier 2184*b* identifies the reach probability from the currently-connected AP for each of the near APs extracted in S107, based on the connected AP information registered in the AP map DB 215*a*.

In step S109, the communication speed identifier 2183 identifies the representative value of the first line communication speeds at positions close to the near APs extracted in S107. In step S110, the estimation information generation unit 218*b* generates the response information. The estimation information generation unit 218*b* generates, as the response information, data including the reach probability identified in S108 and the representative value of the first line communication speed identified in S109. In step S111, the transmission unit 219*b* transmits the response information generated in S110 to the vehicle unit 4*b* of the target vehicle HV that has transmitted the request for the estimation information.

In step S112, when a new travel log is acquired by the travel log acquisition unit 212*a* (YES in S112), the process proceeds to step S113. On the other hand, when the travel log acquisition unit 212*a* has not acquired a new travel log (NO in S112), the process returns to S105 and repeats the processing. In step S113, the DB registration unit 214*a* updates the DB in the same manner as in S74. Then, the process returns to S105 and repeats the processing. Note that the response information transmission related processing may be configured to periodically restart the processing from S101.

<Schematic Configuration of the Vehicle Unit 4*b*>

Figure 25:
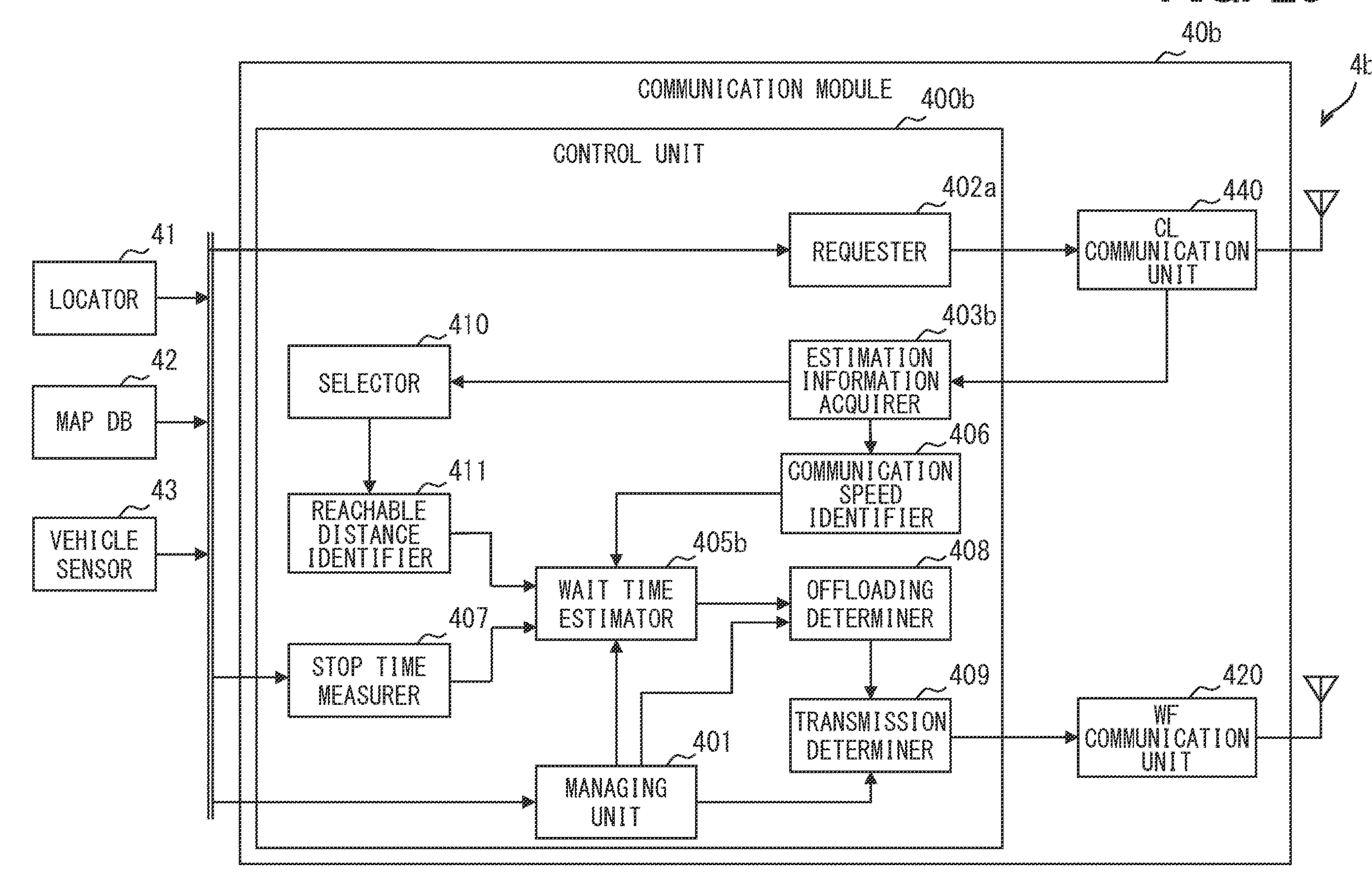
FIG. 25 is a diagram showing an example of a schematic configuration of a vehicle unit, a communication module, and a control unit.

Next, a schematic configuration of the vehicle unit 4*b* is described with reference to FIG. 25. As shown in FIG. 25, the vehicle unit 4*b* includes a communication module 40*b*, the locator 41, the map DB 42, and the vehicle sensor 43. The vehicle unit 4*b* is the same as the vehicle unit 4*a* of the second embodiment except that it includes a communication module 40*b* instead of the communication module 40*a*.

<Schematic Configuration of the Communication Module 40*b*>

Next, a schematic configuration of the communication module 40*b* is described with reference to FIG. 25. As shown in FIG. 25, the communication module 40*b* includes a control unit 400*b*, the WF communication unit 420, and the CL communication unit 440. The communication module 40*b* is the same as the communication module 40*a* of the second embodiment except that it includes a control unit 400*b* instead of the control unit 400*a*. Such a communication module 40*b* also corresponds to a communication device.

<Schematic Configuration of Control Unit 400*b*>

Next, a schematic configuration of the control unit 400*b* is described with reference to FIG. 25. As shown in FIG. 25, the control unit 400*b* includes the managing unit 401, the requester 402*a* (i.e., requesting unit), an estimation information acquirer 403*b* (i.e., estimation information acquiring unit), the selector 410 (i.e., selecting unit), a reachable distance identification unit 411, a wait time estimator 405*b* (i.e., wait time estimator), the communication speed identifier 406 (i.e., communication speed identifying unit), the stop time measurer 407 (i.e., stop time measuring unit), the offloading determiner 408 (i.e., offloading determining unit), and the transmission determiner 409 (i.e., transmission determining unit), respectively provided as functional blocks. The control unit 400*b* is the same as the control unit 400*a* of the third embodiment except that the control unit 400*b* includes the estimation information acquirer 403*b* and the wait time estimator 405*b* instead of the estimation information acquirer 403*a* and the wait time estimator 405*a*, and includes the selector 410 and the reachable distance identification unit 411. The control unit 400*b* also corresponds to a vehicle device. Execution of the processing of each functional block of the control unit 400*b* by the computer also corresponds to execution of the communication management method.

The requester 402*a* transmits a request for the estimation information to the CS 2*b* in the same manner as in the third embodiment. The estimation information acquirer 403*b* acquires the response information transmitted from the CS 2*a* in response to the request for the estimation information. The estimation information acquirer 403*b* acquires the reach probability for each of the near APs. In other words, the estimation information acquirer 403*a* acquires, as the estimation information according to the encounter probability, information on the reach probability between APs identified from the hop records regarding the travels of the plurality of vehicles passing through APs. The processing in the estimation information acquirer 403*b* also corresponds to an estimation information acquisition step.

The selector 410 selects an AP having the highest encounter probability of encountering the target vehicle HV, from among the near APs based on the reach probabilities for each of the near APs acquired by the estimation information acquirer 403*b*. Such a selector 410 corresponds to a vehicle side selector. If an AP whose reach probability is equal to or greater than a threshold value is not found, the selector 410 determines that there is no AP to be selectable, and ends the process. The threshold mentioned here may be set arbitrarily.

The reachable distance identifier 411 identifies the reachable distance from the target vehicle HV to the AP selected by the selector 410 (that is, the selected AP). The reachable distance identifier 411 may identify the reachable distance for the selected AP in the same manner as the reachable distance identifier 2186. The reachable distance identifier 411 corresponds to a vehicle side reachable distance identifier.

The wait time estimator 405*b* estimates the offloading wait time based on the reachable distance identified by the reachable distance identifier 411 in the same manner as the wait time estimator 405*a*. The processing in such a wait time estimator 405*b* also corresponds to a wait time estimation step. It is preferable that the wait time estimator 405*b* corrects and estimates the offloading wait time as a shorter time, as the first line communication speed identified by the communication speed identifier 406 lowers. Further, it is preferable that the wait time estimator 405*b* corrects and identifies the offloading wait time as a longer time, as the stop time measured by the stop time measurer 407 increases. The processing in the offloading determiner 408 and the transmission determiner 409 may be performed in the same manner as in the first embodiment.

<Offloading Related Processing in the Control Unit 400*b*>

Figure 26:
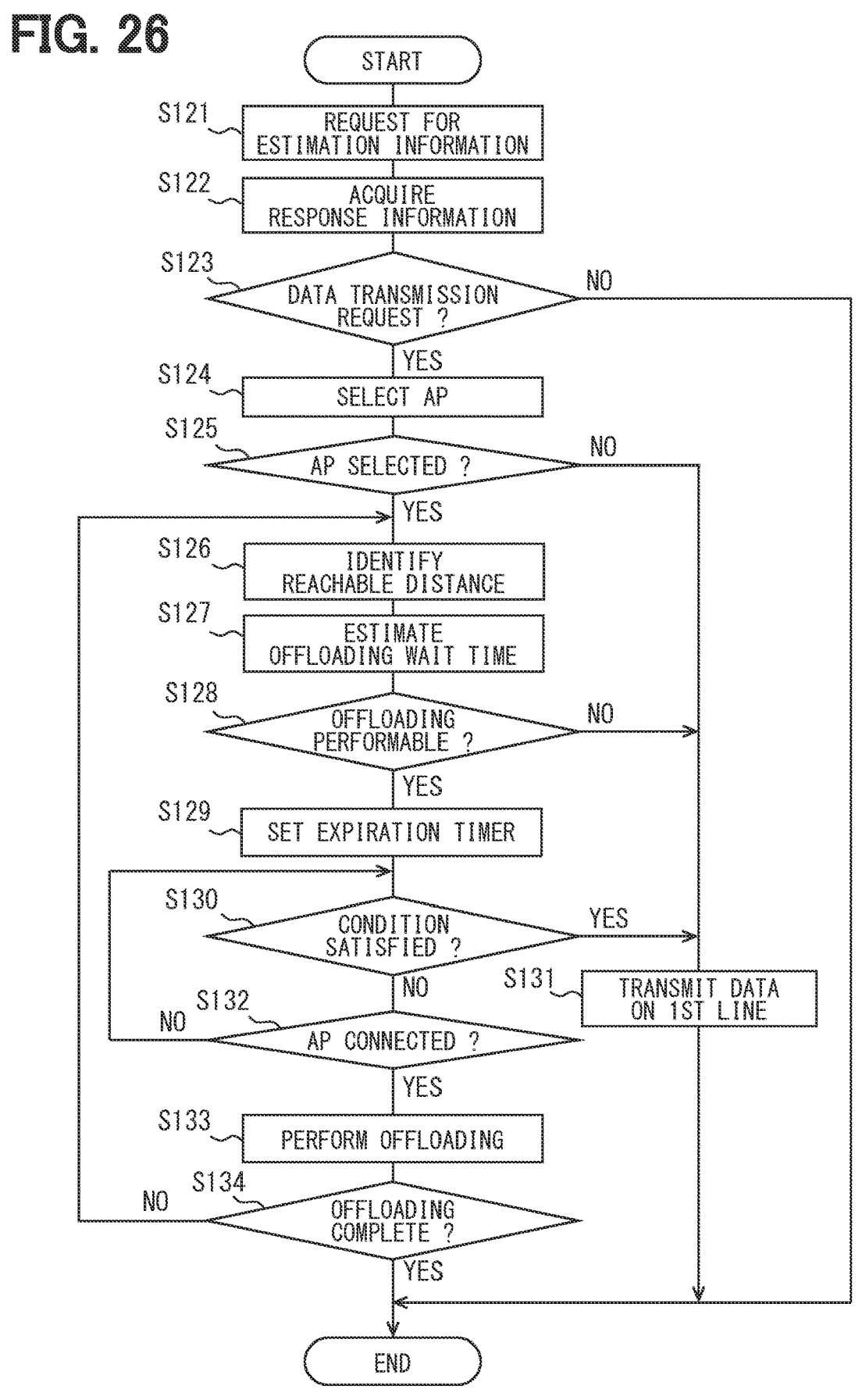

Next, an example of the flow of offloading related processing in the control unit 400*b* is explained by using a flowchart of FIG. 26. The flowchart in FIG. 26 may be configured to start everytime the WF communication unit 420 newly connects to an AP.

First, in step S121, the requester 402*a* transmits a request for the estimation information to the CS 2*b*. In step S122, the estimation information acquirer 403*b* acquires the response information transmitted from the CS 2*b*.

In step S123, similarly to S83, if there is a data transmission request from the end ECU (YES in S123), the process proceeds to step S124. On the other hand, if there is no data transmission request from the end ECU (NO in S123), the offloading related processing ends. In step S124, the selector 410 selects an AP having the highest encounter probability with the target vehicle HV, from among the near APs based on the reach probability of each of the near APs included in the response information acquired in S122.

In step S125, if an AP has actually been selected by the selector 410 (YES in S125), the process proceeds to step S126. On the other hand, if no AP has been selected by the selector 410 (NO in S125), it is determined that there is no selectable AP, and the process proceeds to step S131. In step S126, the reachable distance identifier 411 identifies the reachable distance from the target vehicle HV for the AP selected in S125.

In step S127, the wait time estimator 405*b* estimates the offloading wait time based on the reachable distance identified in S126. In step S128, the offloading determiner 408 determines whether offloading is performable based on the offloading wait time. If it is determined that offloading is performable (YES in S128), the process proceeds to step S129. On the other hand, if it is determined that offloading is impossible (NO in S128), the process proceeds to step S131.

In step S129, the transmission determiner 409 sets an expiration timer, and the process proceeds to step S130. In step S130, when the count value of the expiration timer satisfies the expiration condition (YES in S130), the process proceeds to step S131. On the other hand, if the count value of the expiration timer does not satisfy the expiration condition (NO in S130), the process proceeds to step S132. In step S131, the transmission determiner 409 causes the data to be transmitted on the first line, and ends the offloading related processing.

In step S132, if the WF communication unit 420 is connected to a new AP (YES in S132), the process proceeds to step S133. On the other hand, if the WF communication unit 420 cannot connect to any new AP (NO in S132), the process returns to S130, and repeats the processing. In step S133, the transmission determiner 409 causes the data to be transmitted on the second line, and ends the offloading related processing. That is, offloading is performed.

In step S134, if offloading has been complete (YES in S134), offloading related processing ends. On the other hand, if offloading has not been complete (NO in S134), the process returns to S126 to repeat the processing. Accordingly, when the offloading wait time is corrected by using the stop time, the process is repeated using the corrected offloading wait time.

<Summary of Fourth Embodiment>

According to the configuration of the fourth embodiment, the CS 2*b* transmits, to the target vehicle HV, the estimation information that enables estimation of the offloading wait time, which is the wait time by which time the target vehicle HV should wait before offloading is performable. The estimation information is the reach probability between APs identified from the hop records regarding the travels of the plurality of vehicles passing through APs. Therefore, there is no need to preset or limit the travel route of the target vehicle HV. Further, in the target vehicle HV, based on such a reach probability, the reachable distance from the target vehicle HV to the AP with the highest reach probability is determined. Then, the offloading wait time is estimated based on the determined reachable distance. According to the configuration of the fourth embodiment, it is possible to determine whether offloading is performable based on the estimated offloading wait time, making it easier, by offloading, to transmit the data that is required to be transmitted. As a result, it is possible to improve the offloading rate regarding the transmission of data in the vehicle without limiting the vehicle's travel route or without presetting the vehicle's travel route.

Fifth Embodiment

In the fourth embodiment, a configuration is shown, in which the CS 2*b* narrows down the near APs to which the CS 2*b* transmits the reach probability, but the vehicle unit 4*b* may narrow down the near APs (hereinafter referred to as the fifth embodiment). For example, the vehicle unit 4*b* may perform narrowing down to exclude APs included in the AP detection past history from near AP candidates. In such case, a narrowing down on a CS 2*b* side is omissible, and the CS 2*b* may simply transmit the reach probability for each of the near APs. Further, the vehicle unit 4*b* may narrow down near AP candidates based on a determination result as to whether or not offloading is performable on the candidates. In such case, a narrowing down on a CS 2*b* side is omissible, and the CS 2*b* may simply transmit the reach probability for each of the near APs.

Sixth Embodiment

In the above-described embodiments, as the first line communication speed identified by the communication speed identifier 406 lowers, the grace period for delaying the data transmission on the first line is decreased, but it is not necessary to limit the configuration to such one. For example, a configuration in which such a processing is not performed may also be adoptable. Further, a processing may be omissible, in which estimation of the offloading wait time is corrected to be a shorter time as the first line communication speed lowers. In such case, the control units 400, 400*a*, and 400*b* may be configured without the communication speed identifier 406. Further, a configuration may be adopted in which the first line communication speed is not transmitted from the CS 2, 2*a*, 2*b*.

Seventh Embodiment

Although the configuration in which the communication modules 40, 40*a*, and 40*b* include respectively the control units 400, 400*a*, and 400*b* has been described in the above-described embodiments, the configuration is not necessarily limited to such one. For example, the functions of the control units 400, 400*a*, and 400*b* may be performed by an in-vehicle ECU other than the communication modules 40, 40*a*, and 40*b*.

Eighth Embodiment

In the above-described embodiments, an example in which the first line is a cellular line and the second line is a wireless LAN line has been described. However, the configuration is not necessarily limited thereto. For example, both of the first line and the second line may be cellular lines. For example, the first line may be LTE and the second line may be 5G, or the like.

It should be noted that the present disclosure is not limited to the embodiments described above, and various modifications are possible within the scope indicated in the claims, and embodiments acquired by appropriately combining technical means disclosed in different embodiments are also included in the technical scope of the present disclosure.

What is claimed is:

1. A vehicle device for a target vehicle equipped with a communication device using a first line and a second line with respectively different communication methods for data transmission via a wireless network, and offloads data transmission from the first line to the second line, the vehicle device comprising at least one of (i) a circuit and (ii) a processor with a memory storing computer program code executable by the processor, the at least one of the circuit and the processor configured to cause the vehicle device to implement:

an estimation information acquirer configured to acquire estimation information that enables estimation of an offloading wait time according to an encounter probability at which the target vehicle encounters an access point of the wireless network used as the second line;

a wait time estimator configured to estimate the offloading wait time based on the estimation information acquired by the estimation information acquirer; and an offloading determiner configured to determine whether or not offloading is performable based on the offloading wait time estimated by the wait time estimator, wherein the estimation information acquirer acquires, as the estimation information corresponding to the encounter probability, information on the reach probability between the access points identified from hop records regarding travels of a plurality of vehicles passing through the access points, the at least one of the circuit and the processor is further configured to cause the vehicle device to implement:

a vehicle-side selector configured to select the access point with a highest reach probability of the target vehicle based on information on the reach probability between the access points acquired by the estimation information acquirer; and a vehicle-side reachable distance identifier configured to identify a reachable distance, which is a distance from the target vehicle, for the access point selected by the vehicle-side selector, and the wait time estimator estimates the offloading wait time based on the reachable distance identified by the vehicle-side reachable distance identifier.

2. The vehicle device according to claim 1, wherein the estimation information acquirer is configured to acquire an area-specific wait time, which is a wait time estimated to be required for using the second line, for each of divided areas respectively as a predetermined unit section, and which is determined according to the encounter probability of the target vehicle encountering the access point by using information on a distribution of access points as the estimation information according to the encounter probability, and the wait time estimator estimates the offloading wait time based on the area-specific wait time acquired by the estimation information acquirer.

3. The vehicle device according to claim 1, wherein the estimation information acquirer estimates and acquires, as the estimation information corresponding to the encounter probability, a reachable distance, which is a distance from the target vehicle to an access point that has a highest reach probability of the target vehicle, based on estimation of the reach probability performed by using the reach probability between access points identified by hop records regarding travels of a plurality of vehicles passing through the access points, and the wait time estimator estimates the offloading wait time based on the reachable distance acquired by the estimation information acquirer.

4. The vehicle device according to claim 1, wherein the at least one of the circuit and the processor is further configured to cause the vehicle device to implement:

a stop time measurer configured to measure a stop time when the target vehicle stops, wherein the wait time estimator identifies the offloading wait time by correcting the offloading wait time to be a longer time as the stop time measured by the stop time measurer increases.

5. The vehicle device according to claim 1, wherein the at least one of the circuit and the processor is further configured to cause the vehicle device to implement:

a communication speed identifier configured to identify a communication speed on the first line; and a transmission determiner configured to determine whether to delay data transmission on the first line for offloading of the data transmission by using the offloading wait time estimated by the wait time estimator, wherein the transmission determiner shortens a grace period during which data transmission on the first line is delayable, as the communication speed on the first line identified by the communication speed identifier becomes lower.

6. A communication management method in a target vehicle and implemented by at least one processor, the target vehicle being equipped with a communication device using a first line and a second line with respectively different communication methods for data transmission via a wireless network, and offloads data transmission from the first line to the second line, the communication management method comprising:

acquiring estimation information that enables estimation of an offloading wait time according to an encounter probability at which the target vehicle encounters an access point of the wireless network used in the second line;

estimating the offloading wait time based on the acquired estimation information; and determining whether or not offloading is performable based on the estimated offloading wait time, wherein the acquiring of the estimation information corresponding to the encounter probability includes acquiring information on the reach probability between the access points identified from hop records regarding travels of a plurality of vehicles passing through the access points, the communication management method further comprising:

selecting the access point with a highest reach probability of the target vehicle based on information on the reach probability between the access points acquired in the acquiring of the estimation information; and identifying a reachable distance, which is a distance from the target vehicle, for the selected access point, and the estimating of the offloading wait time estimates the offloading wait time based on the identified reachable distance.

* * * * *